(12) United States Patent
Ogo et al.

(10) Patent No.: US 8,332,933 B2
(45) Date of Patent: Dec. 11, 2012

(54) PROCESSING APPARATUS WITH TOUCH PANEL

(75) Inventors: Atsushi Ogo, Kyoto (JP); Yuji Okamoto, Kyoto (JP); Shuhji Fujii, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 536 days.

(21) Appl. No.: 12/262,482

(22) Filed: Oct. 31, 2008

(65) Prior Publication Data
US 2009/0141951 A1 Jun. 4, 2009

(30) Foreign Application Priority Data

Nov. 30, 2007 (JP) ................................. 2007-311427

(51) Int. Cl.
*G06F 7/04* (2006.01)
(52) U.S. Cl. .......................................... 726/19; 713/186
(58) Field of Classification Search ..................... 726/19; 713/186
See application file for complete search history.

(56) References Cited

U.S. PATENT DOCUMENTS

| | | | |
|---|---|---|---|
| 6,879,710 B1 * | 4/2005 | Hinoue et al. | 382/124 |
| 2005/0185828 A1 * | 8/2005 | Semba et al. | 382/124 |
| 2006/0087424 A1 * | 4/2006 | Koike | 340/539.1 |
| 2006/0136992 A1 * | 6/2006 | Shigeeda | 726/2 |
| 2007/0092118 A1 * | 4/2007 | Tachibana | 382/125 |
| 2007/0236330 A1 * | 10/2007 | Cho et al. | 340/5.54 |
| 2008/0187189 A1 * | 8/2008 | Shin et al. | 382/124 |

FOREIGN PATENT DOCUMENTS

| | | |
|---|---|---|
| CN | 1316864 | 10/2001 |
| JP | 2004-013682 | 1/2004 |
| JP | 2004-030392 | 1/2004 |
| JP | 2004-054395 | 2/2004 |
| JP | 2006-018426 | 1/2006 |
| JP | 2006-179977 | 7/2006 |
| JP | 2007-293539 | 11/2007 |
| JP | 2007-304646 | 11/2007 |

OTHER PUBLICATIONS

"Ekishoupaneru De Syashin Mo Meishi Mo Yomikomeru Toshiba 'Input Display'" Online, URL: <http://www.wince.ne.jp/snap/ceSnapView.asp?PID=1453>, searched on Nov. 7, 2007.

* cited by examiner

*Primary Examiner* — Cordelia Zecher
(74) *Attorney, Agent, or Firm* — Edwards Wildman Palmer LLP; David G. Conlin; Steven M. Jensen

(57) ABSTRACT

When a user operates a processing apparatus through a touch panel, a fingerprint processing unit reads fingerprint information of the user's finger. Each time when the fingerprint processing unit reads fingerprint information, a CPU judges whether the read fingerprint information is identical to a fingerprint information of authenticated user. If being identical, the processing apparatus executes a process in accordance with an operation accepted through the touch panel. These two fingerprint information are identical each other if the operating user through the operation accepting panel is the authenticated user. It means that the processing apparatus judges whether the operating user is the authenticated user, each time when the user operates. If the user is the authenticated user, the process in accordance with the operation by this user is then executed.

11 Claims, 13 Drawing Sheets

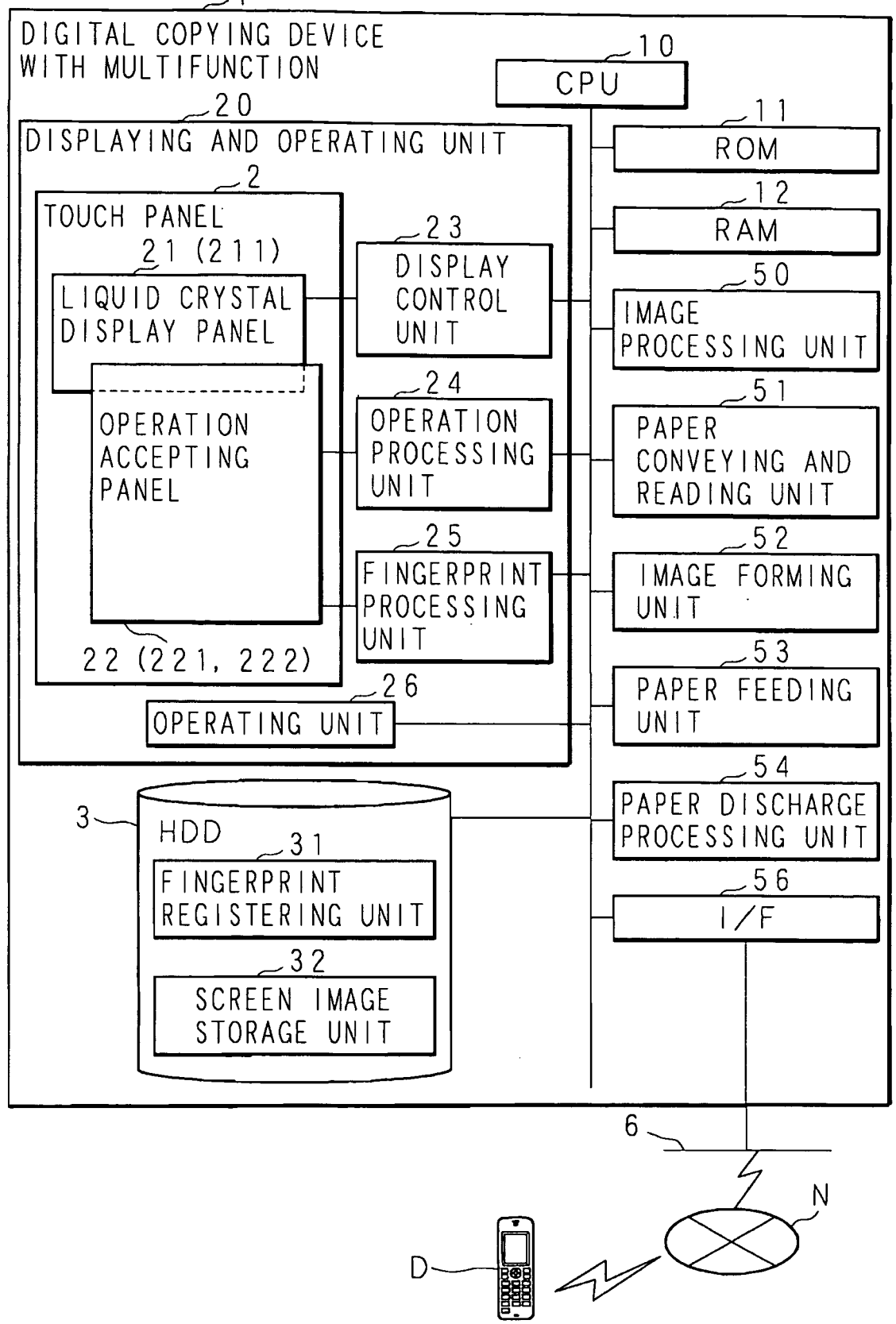

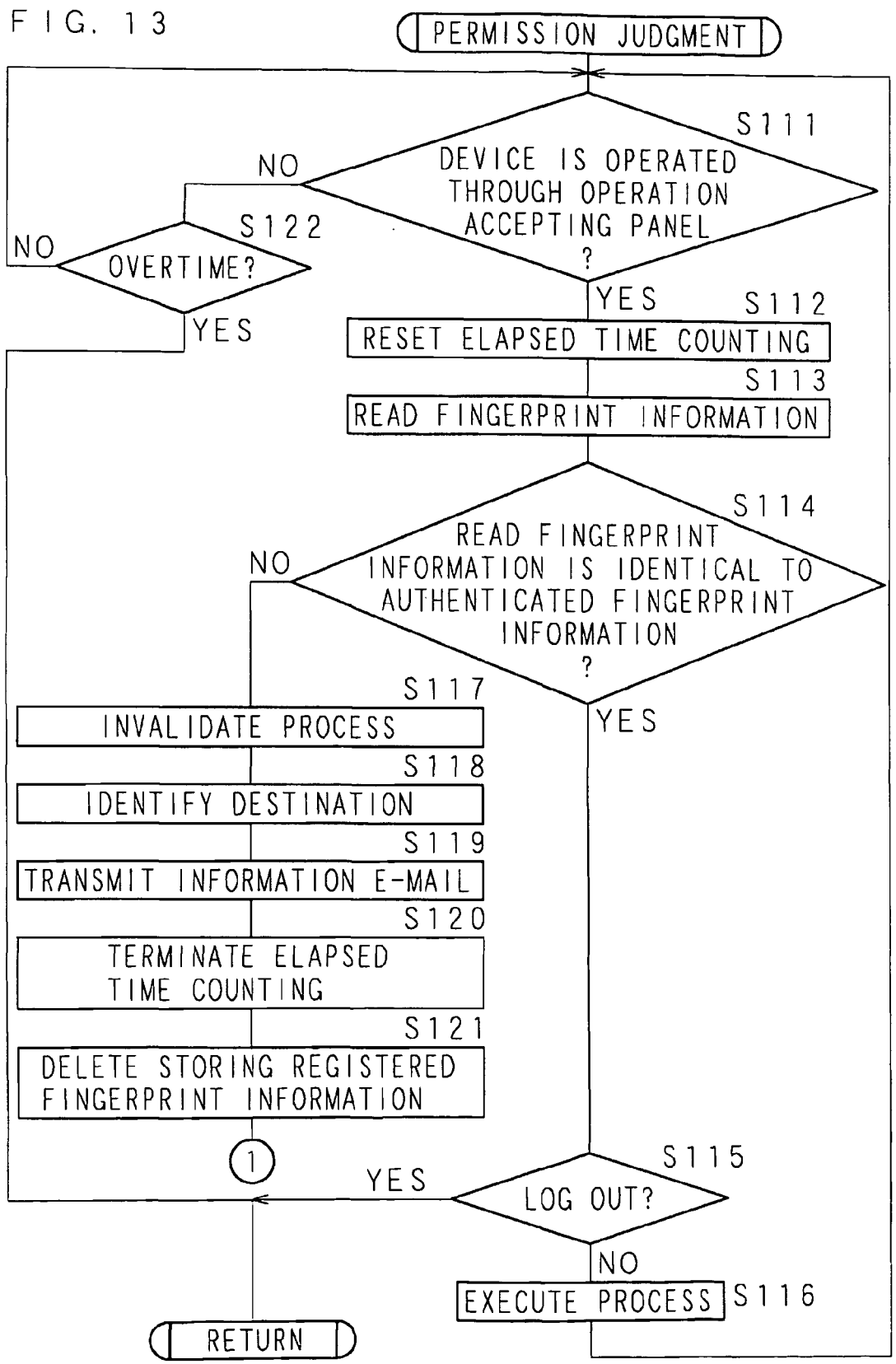

PROCESSING APPARATUS WITH TOUCH PANEL

CROSS-REFERENCE TO RELATED APPLICATION(S)

This non-provisional application claims priority under 35 U.S.C. §119(a) on Patent Application No. 2007-311427 filed in Japan on Nov. 30, 2007, the entire content of which is hereby incorporated by reference.

BACKGROUND

1. Field of the Invention

The present invention relates to a processing apparatus comprising a touch panel that has a display panel displaying an operable screen image and an operation panel accepting an operation.

2. Description of Related Art

A recent image processing device, such as a photocopier and a facsimile machine authenticates a user before use. The image processing device permits only a user who is registered in the image processing device to use the image processing device, and prohibits a user who is not registered to use the image processing device to improve its security. Furthermore, the image processing device stores, in a storage device, a date and time of operation and an operation content, etc. of a user who is identified by the authentication and, thus, administrates its usage (e.g., management of the user, and management of using condition).

The image processing device is known to utilize, for authentication, user information such as combined ID and password, and fingerprint. In the image processing device, information for user authentication is registered in advance. The image processing device authenticates an user based on whether inputted information by the user is identical to the registered information or not.

Meanwhile, a tablet input device is disclosed that utilizes a stylus pen including a sensor for fingerprint recognition (Japanese Patent Application Laid-Open No. 2005-18426). This stylus pen stores an individual fingerprint data in advance. If a fingerprint information read by the sensor is identical to the stored individual fingerprint data, the stylus pen can start to operate the tablet input device. If not, then an alert is performed.

In addition, a display device is disclosed that displays an image on a display surface and reads two-dimensional information from the same surface (Japanese Patent Application Laid-Open No. 2006-179977). It is proposed to utilize such a display device for fingerprint authentication (EKISHYOUPANERU DE SYASHIN MO MEISHI MO YOMIKOMERU Toshiba 'Input Display' (A Picture and a Business Card can be Read with an LCD Panel—Toshiba Corporation 'Input Display') [Online], [Searched on Nov. 7, 2007], Internet<URL: http://www.wince.ne.jp/snap/ceSnapView.asp?PID=1453>).

SUMMARY

In a conventional image processing device, once a first user's authentication is performed, the user is permitted to use the image processing device. At this point, the other user who is not authenticated can freely operate the image processing device when the other user tries to use the image processing device instead of the first authenticated user, because the restriction to use the image processing device has already been canceled by the first authenticated user. Such a problem is not preferred for security and management of usage, because it may allow the other user, who is not authenticated, to bring out sensitive data handled in the image processing device by the first user who has been authenticated, or may charge a cost for usage of the image processing device by the other non-authenticated user to the first authenticated user.

The stylus pen, disclosed in Japanese Patent Application Laid-Open No. 2005-18426, stores a fingerprint of proper user, but not a fingerprint of the other improper user. The other improper user then cannot use this stylus pen to operate the tablet input device, normally. However, it is a problem that the non-authenticated improper user may be able to use the stylus pen to operate the tablet input device after the proper user has performed the authentication, for example, by obtaining the stylus pen from the authenticated proper user.

If the image processing device utilizes a stylus pen as an operational tool, it may be a problem to provide a special type of stylus pen, such as disclosed in Japanese Patent Application Laid-Open No. 2005-18426, and to fail to operate without the stylus, for example, by missing. In addition, there is a disadvantage that inoperability without the stylus pen decreases convenience of the image processing device, when compared to a general image processing device that utilizes a user's finger as an operational tool.

If many users share the image processing device, the device has to require an equal number of stylus pens with the users, or the stylus pen has to store a plurality of fingerprint data in a compact memory that can be built into the stylus pen. Therefore, such an image processing device with the stylus pen seems to be impractical.

As proposed in "EKISHYOUPANERU DE SYASHIN MO MEISHI MO YOMIKOMERU Toshiba 'Input Display' (A Picture and a Business Card can be Read with an LCD Panel—Toshiba Corporation 'Input Display') [Online], [Searched on Nov. 7, 2007], Internet<URL: http://www.wince.ne.jp/snap/ceSnapView.asp?PID=1453>", the finger operable image processing device provided with the display disclosed in Japanese Patent Application Laid-Open No. 2006-179977 for fingerprint authentication, fails to prevent an non-authenticated improper user from using the device after a proper user has performed the fingerprint authentication.

The present invention has been made taking the foregoing problems into consideration and a main object of the present invention is to provide a processing apparatus having a configuration that fingerprint information of a user is read from a touch panel and judged whether to be identical to fingerprint information stored in advance each time when the user's finger touches the touch panel, and if judged to be identical, a process in accordance with operation input by the finger through the touch panel is performed, thus the user authentication is performed each time the user operates the apparatus.

An processing apparatus according to an aspect of the present invention, comprises a touch panel which has a display panel displaying an operable screen image and an operation panel accepting an operation; a processing unit which performs a process in accordance with the operation accepted by the touch panel; a fingerprint storage unit which stores fingerprint information; a reading unit which reads fingerprint, from the touch panel, information of a finger touching the touch panel; and an identity judgment unit which judges each time when the reading unit reads fingerprint information whether the fingerprint information read by the reading unit and the fingerprint information stored in the fingerprint storage unit are identical; wherein the processing unit executes the process in accordance with the operation accepted by the touch panel when the identity judgment unit judges the fingerprints to be identical.

The processing apparatus according to an aspect of the present invention, may comprise the processing unit that does not execute the process in accordance with the operation accepted by the touch panel when the identity judgment unit judges the fingerprints not to be identical.

The processing apparatus according to an aspect of the present invention, may comprise an invalidating unit which invalidates, when the identity judgment unit judges the fingerprints not to be identical, the process that the processing unit has executed before the identity judgment unit judges the fingerprints not to be identical.

The processing apparatus according to an aspect of the present invention, may comprise a registering unit which registers fingerprint information; a registering judgment unit which judges whether the fingerprint information read by the reading unit and the fingerprint information registered in the registering unit are identical; and a storing control unit which exclusively stores one fingerprint information, that is identical to the fingerprint information read by the reading unit and is registered in the registering unit, in the fingerprint storage unit, when the registering judgment unit has judged the fingerprints to be identical.

The processing apparatus according to an aspect of the present invention, may comprise the registering judgment unit that is allowed to judge when the identity judgment unit has judged the fingerprints not to be identical.

The processing apparatus according to an aspect of the present invention, may comprise a condition judgment unit which judges whether a predetermined condition indicating that a use of the processing apparatus is terminated is established; wherein the registering judgment unit is allowed to judge when the condition judgment unit judges the condition to be established, and the registering judgment unit is not allowed to judge when the condition judgment unit judges the condition not to be established.

The processing apparatus according to an aspect of the present invention, may comprise a registering control unit which makes the registering unit, when the registering judgment unit judges the fingerprints not to be identical, register the fingerprint information read by the reading unit; wherein after the registering control unit makes the registering unit register the fingerprint information, the storing control unit exclusively stores the fingerprint information in the fingerprint storage unit.

The processing apparatus according to an aspect of the present invention, may comprise a screen image storage unit which stores the fingerprint information registered in the registering unit and an operable screen image to be displayed on the touch panel so as to associate with each other; and a display control unit which displays the operable screen image stored in the screen image storage unit on the touch panel, wherein when the registering judgment unit judges the fingerprints to be identical, the display control unit displays one of the operable screen associated with the fingerprint information that is identical to the fingerprint information read by the reading unit and is registered in the registering unit.

The processing apparatus according to an aspect of the present invention, may comprise a destination storage unit which stores fingerprint information and destination information to transmit a predetermined message, so as to associate with each other; and a transmitting unit which transmits the predetermined message; wherein, when the identity judgment unit judges the fingerprints not to be identical, the transmitting unit transmits the predetermined message to a destination corresponding to the destination information that is stored in the destination storage unit and is associated with the fingerprint information stored in the fingerprint storage unit.

According to the aspect of the present invention, the processing apparatus comprises the touch panel that has a display panel displaying an operable screen image and an operation panel accepting an operation, the processing unit, the fingerprint storage unit, the reading unit, and the identity judgment unit. Here, the touch panel displays the operable screen image to be viewed by a user, and accepts the operation from the user.

The fingerprint storage unit stores fingerprint information.

When the user touches the touch panel to operate the processing apparatus, the reading unit reads fingerprint information of a finger touching the touch panel. The identity judgment unit judges whether the fingerprint information read by the reading unit and the fingerprint information stored in the fingerprint storage unit are identical each time when the reading unit reads fingerprint information. When the identity judgment unit judges the fingerprints to be identical, the processing unit executes a process in accordance with the operation accepted by the touch panel.

The case in which the identity judgment unit judges to be identical, means a case in which the user who has touched the touch panel for operation is a user corresponding to a fingerprint information stored in the fingerprint storage unit (hereinafter, referred to as an "authenticated user"). In short, the processing apparatus of the present invention judges whether a user is an authenticated user or not, each time when the user operates the processing apparatus. When the user is the authenticated user, the processing apparatus performs a process in accordance with the user operation.

Each time the user touches the touch panel to operate the processing apparatus, the read fingerprint information can be checked with the fingerprint information stored in advance. Therefore, the processing apparatus can perform the user authentication at each user operation.

Thus, the processing apparatus enhances security. For example, the processing apparatus prevents an apparatus abuse such that a non-authenticated user operates the processing apparatus to bring out sensitive data after the other user has performed the fingerprint authentication. In addition, it brings an appropriate usage management of the authenticated user. Therefore, the processing apparatus is able to charge correctly to the authenticated user in accordance with the usage status of the processing apparatus permitted by the authentication.

Further, a user can operate the processing apparatus with the user's finger. The processing apparatus enhances convenience, for example, because it does not require the special stylus pen.

According to the aspect of the present invention, the processing unit may not execute a process for the operation accepted from the touch panel, when the identity judgment unit judges the fingerprints not to be identical.

What the identity judgment unit judges the fingerprints not to be identical, means that a non-authenticated user touches the touch panel to operate. It means that the processing apparatus of the present invention authenticates whether a user is authenticated or not, each time when the user operates the processing apparatus. If the user is a non-authenticated user, execution of the process in accordance with the user operation may be prohibited.

Therefore, the processing apparatus may prevent such inconvenience that the non-authenticated user uses the processing apparatus.

According to the aspect of the present invention, the processing apparatus may further comprise the invalidating unit. When the identity judgment unit judges the fingerprints not to be identical, the invalidating unit invalidates a process executed by the processing unit before the identity judgment unit judges the fingerprints not to be identical.

What the identity judgment unit judges the fingerprints not to be identical, means that a non-authenticated user touches the touch panel to operate. The non-authenticated user means a user other than the authenticated user.

There may be a possibility that the authenticated user operates the processing apparatus to execute a desired process before the non-authenticated user touches the touch panel to operate. Therefore, invalidation of the process executed for the operation of the authenticated user may prevent abuses, harmful influences, and so on.

According to the aspect of the present invention, the processing apparatus may further comprise the registering unit, the registering judgment unit, and the storage control unit.

The registering unit may register fingerprint information of a user who is authorized to use the processing apparatus. The user whose fingerprint information is registered in the registering unit is hereinafter referred to as a "registered user."

The registering judgment unit judges whether the fingerprint information read by the reading unit is identical to the fingerprint information registered in the registering unit. The judgment by the registering judgment unit may differ from the judgment by the identity judgment unit, and may not judge each time when the reading unit reads fingerprint information.

When the registering judgment unit judges the fingerprints to be identical, the storage control unit exclusively stores, in the fingerprint storage unit, a fingerprint information that is identical to a read fingerprint information by the reading unit and is registered in the registering unit. It means that the storage control unit may store, in the fingerprint storage unit, fingerprint information for a single person corresponding to the registered user operating the processing apparatus.

After the fingerprint information of the registered user is stored in the fingerprint storage unit, the processing apparatus may permit this registered user to use the processing apparatus as the authenticated user. Therefore, the processing apparatus may permit a process in accordance with the operation by the registered user who corresponds to the fingerprint information stored in the fingerprint storage unit.

According to the aspect of the present invention, the registering judgment unit may judge when the identity judgment unit judges the fingerprints not to be identical.

What the identity judgment unit judges the fingerprints not to be identical, means that a non-authenticated user touches the touch panel to operate. There is a possibility that the non-authenticated user who operates the processing apparatus (operating user) is a registered user.

For this reason, when fingerprint information of the operating user is registered in the registering unit (i.e., when the registering judgment unit judges the fingerprints to be identical), the fingerprint information of the operating user may be exclusively stored in the fingerprint storage unit. Thus, the operating user may become a new authenticated user to be able to use the processing apparatus. In turn, the other registered user, who has been the authenticated user until the operating of the operating user, may become a non-authenticated user.

According to the aspect of the present invention, the processing apparatus may further comprise the condition judgment unit.

The condition judgment unit judges whether the predetermined condition is established. The predetermined condition may be a condition indicating that the authenticated user finishes to use the processing apparatus.

If the condition judgment unit judges the condition to be established (i.e., if the authenticated user has finished to use the processing apparatus), the registering judgment unit may be allowed to judge. Therefore, when a registered user, who is not authenticated, operates the processing apparatus that is not used, the registered user may become a new authenticated user who is able to use the processing apparatus.

If the condition judgment unit judges the condition not to be established (i.e., if the authenticated user is still using the processing apparatus), the registering judgment unit may not be allowed to judge. Therefore, when a registered user, who is not authenticated, operates the processing apparatus that is in use by an authenticated user, the registered user may not be able to become the new authenticated user who is able to use the processing apparatus.

Therefore, the authenticated user may not be interfered the use of the processing apparatus by the non-authenticated user.

According to the aspect of the present invention, the processing apparatus may further comprise the registering control unit.

The registering control unit makes the registering unit register the read fingerprint information by the reading unit, if the registering judgment unit judges the fingerprints not to be identical. After the registering control unit makes the registering unit register the read fingerprint information by the reading unit, the storage control unit may make the fingerprint storage unit exclusively store the read fingerprint information.

What the registering judgment unit judges the fingerprints not to be identical means that a non-registered user operates the processing apparatus. Then, the processing apparatus may register this non-registered user in the registering unit to be a new registered user. The fingerprint storage unit may exclusively store a fingerprint information of the new registered user, and the new registered user becomes a new authenticated user who is able to use the processing apparatus.

It means that only the registered user can operate the processing apparatus. Therefore, the processing apparatus may manage the usage by the registered user as similar to the usage by the other registered users who are registered in advance. In addition, it may prevent the non-registered user who is not managed from using the processing apparatus.

According to the aspect of the present invention, the processing apparatus may further comprise the screen image storage unit and the display control unit.

The screen image storage unit may store the fingerprint information registered in the registering unit and the operable screen image to be displayed on the touch panel so as to associate with each other. It is preferable that this operable screen image may correspond to the registered user whose fingerprint information is registered in the registering unit.

If the registering judgment unit judges the fingerprints to be identical, the display control unit may display, on the touch panel, an operable screen image stored in the screen image storage unit so as to associate with a fingerprint information that is identical to the fingerprint information read by the reading unit and is registered in the registering unit. Therefore, the processing apparatus may display the operable screen image appropriate for the registered user on the touch panel, and then enhances convenience for the registered user.

According to the aspect of the present invention, the processing apparatus may further comprise the destination storage unit and the transmitting unit.

The destination storage unit may store the fingerprint information and the destination information to which the predetermined message is sent, so as to associate with each other. The destination information preferably represents the user's destination information corresponding to the fingerprint information, or destination information of the administrator of the processing apparatus.

If the identity judgment unit judges the fingerprints not to be identical, the transmitting unit may transmit the predetermined message with using the destination information stored in the destination storage unit that is associated with the fingerprint information stored in the fingerprint storage unit.

What the identity judgment unit judges the fingerprints not to be identical, means that a non-authenticated user operates the processing apparatus. Therefore, if the non-authenticated user operates the processing apparatus, the user who corresponds to the fingerprint information stored in the fingerprint storage unit (i.e., the authenticated user) or an administrator may receive the predetermined message.

The predetermined message preferably indicates that the non-authenticated user operates the processing apparatus, or an influence and the like which the person receiving the message can take after the non-authenticated user's operation. In this case, the processing apparatus enhances convenience for the authenticated user or the administrator. In addition, the processing apparatus enhances the security.

The above and further objects and features of the invention will more fully be apparent from the following detailed description with accompanying drawings.

BRIEF DESCRIPTION OF THE SEVERAL VIEWS OF THE DRAWINGS

FIG. 7 is a block diagram showing a configuration of major portions of a copying device with multifunction as a processing apparatus according to Embodiment 2 of the present invention.

FIG. 13 is a flowchart showing a subroutine of permission judgment process executed by the CPU of the copying device with multifunction according to Embodiment 4 of the present invention.

DETAILED DESCRIPTION

Hereinafter, the present invention is described in detail based on the drawings illustrating embodiments thereof.

Embodiment 1

Figure 1:
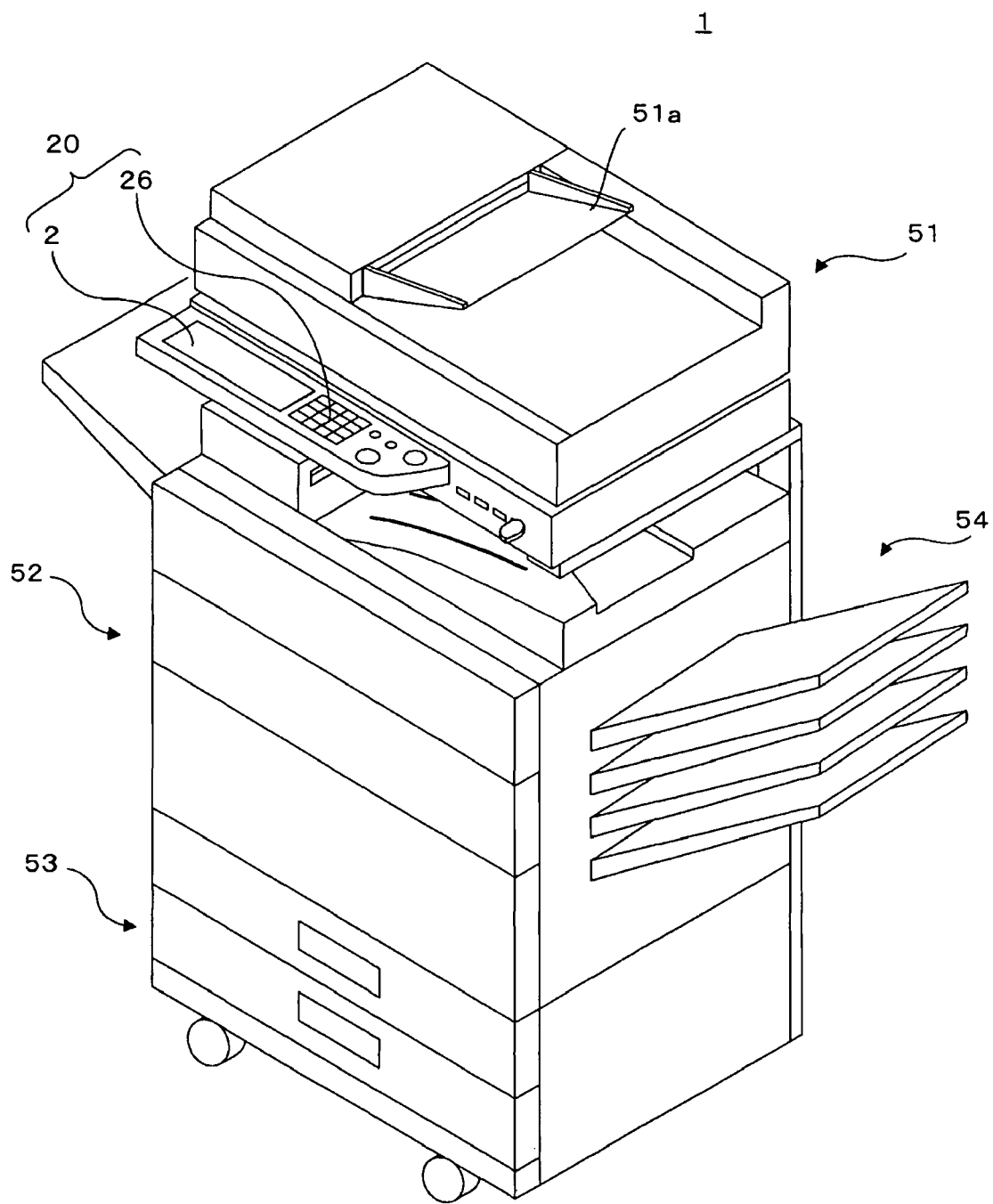
FIG. 1 is a perspective view schematically showing a copying device with multifunction as a processing apparatus according to Embodiment 1 of the present invention.
Figure 2:
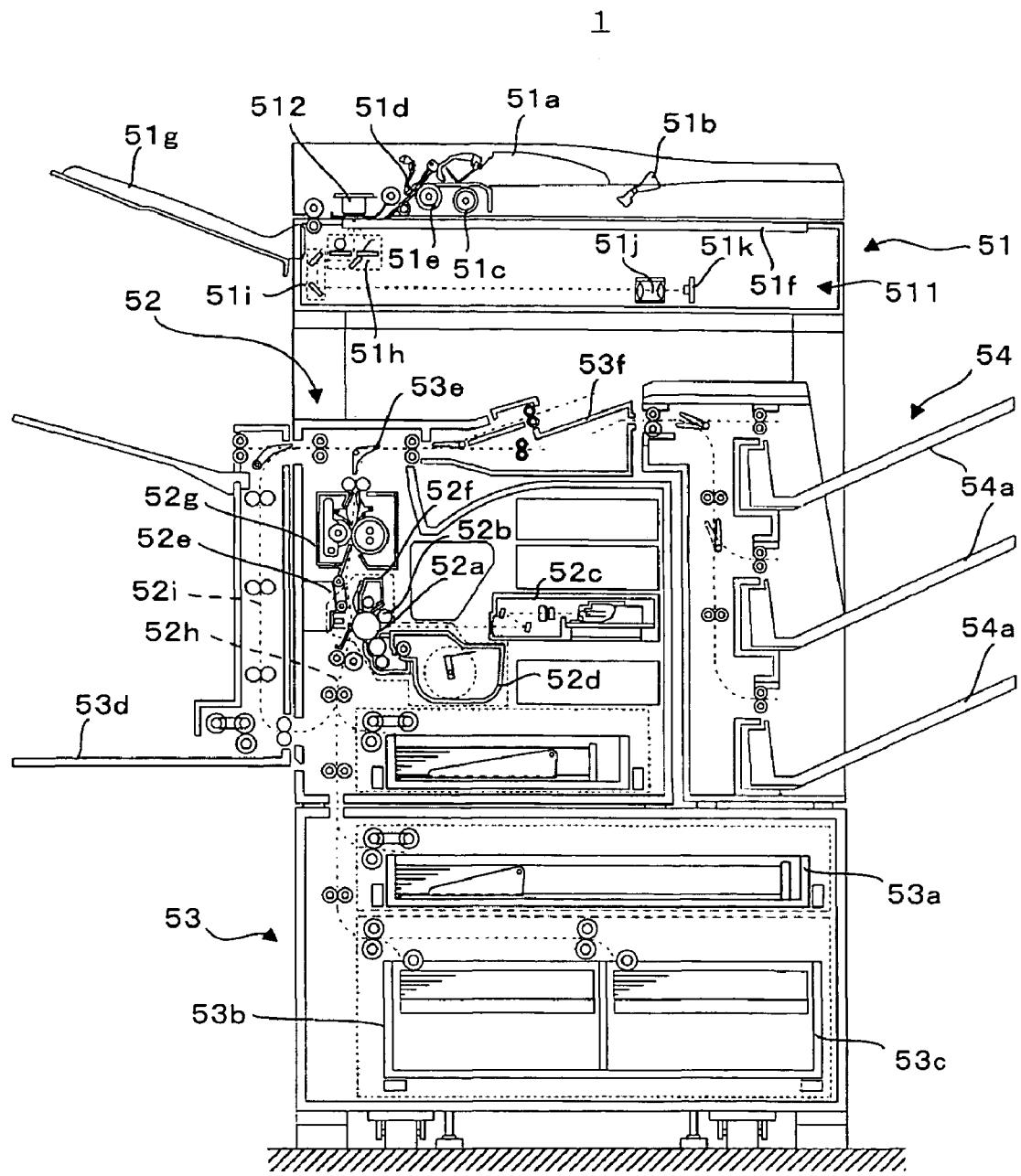
FIG. 2 is a longitudinal cross-sectional view schematically showing an inner structure of the copying device with multifunction according to Embodiment 1 of the present invention.
Figure 3:
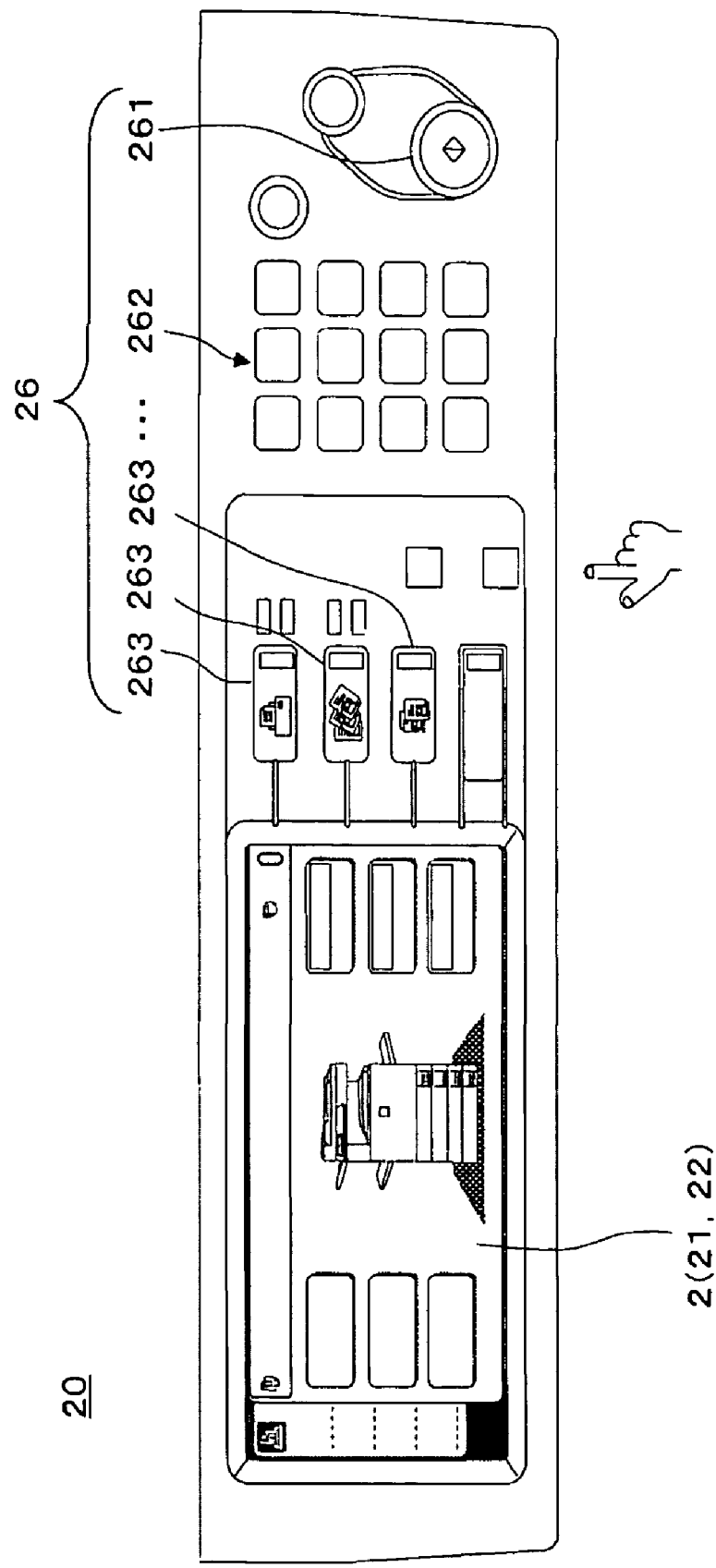
FIG. 3 is a plan view schematically showing a touch panel provided to the copying device with multifunction according to Embodiment 1 of the present invention.
Figure 4:
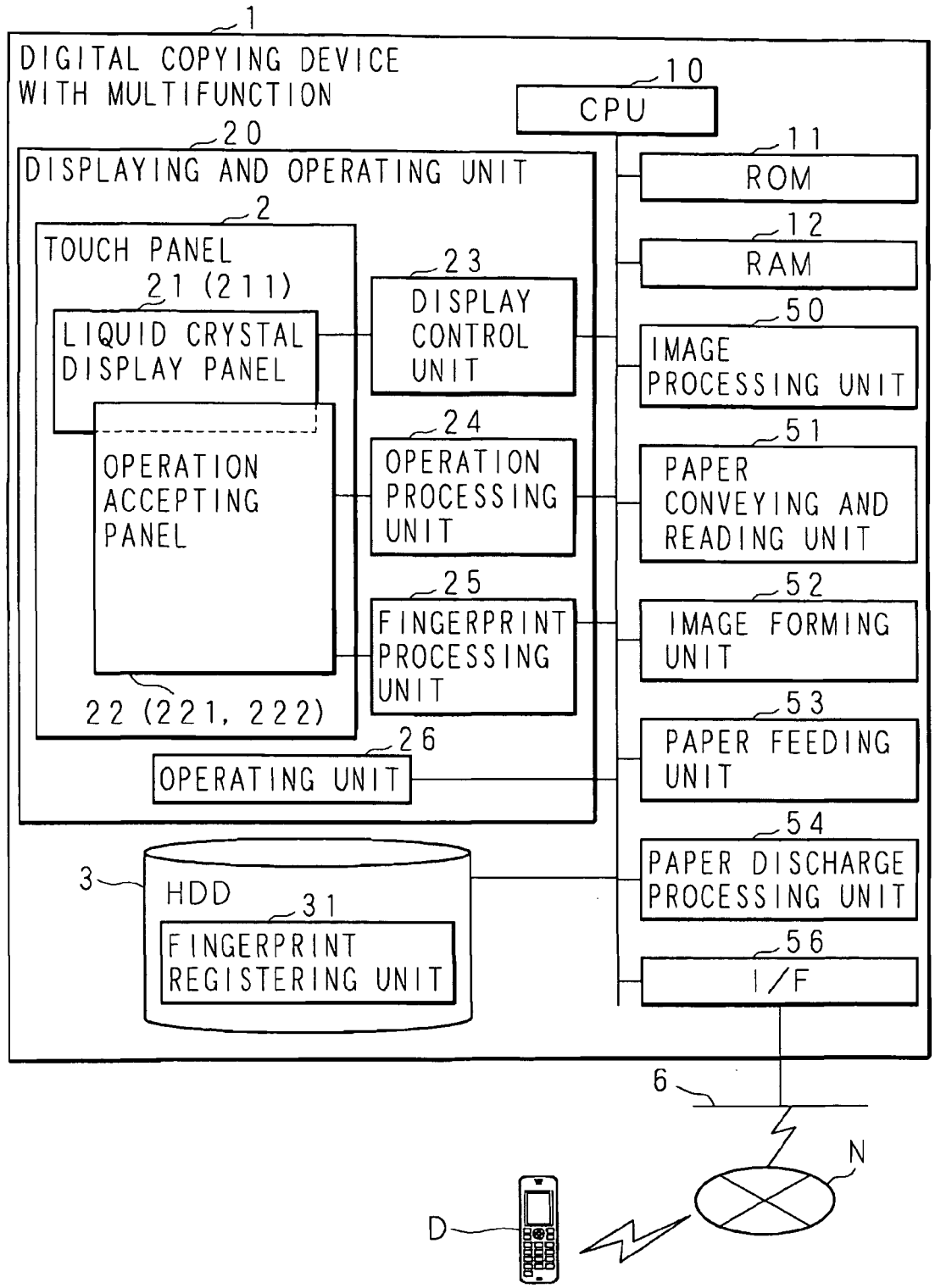
FIG. 4 is a block diagram showing a configuration of major portions of the copying device with multifunction according to Embodiment 1 of the present invention.

FIG. 1 is a perspective view schematically showing a digital copying device with multifunction (hereinafter, referred to as a "multifunction copying device") as a processing apparatus according to Embodiment 1 of the present invention, and FIG. 2 is a longitudinal cross-sectional view schematically showing an inner structure of the multifunction copying device. FIG. 3 is a plan view schematically showing a touch panel provided to the multifunction copying device according to Embodiment 1 of the present invention, and FIG. 4 is a block diagram showing a configuration of major portions of the multifunction copying device.

In the figures, a reference numeral "1" indicates a multifunction copying device. The multifunction copying device 1 has a plurality of functions, such as a copying function, a network printer function, a facsimile function, and an Internet facsimile function, and is configured so that these functions may be selectively executed. For these functions, the multifunction copying device 1 is provided with a unique IP address, a facsimile number, an e-mail address, etc.

If the copying function is executed, the multifunction copying device 1 reads image information from an original paper, and forms an image (i.e., prints out) on a recording paper based on the read image information.

If the network printer function is executed, the multifunction copying device 1 receives image information from a non-illustrated personal computer (hereinafter, referred to as a "PC") that is connected to the multifunction copying device 1 through a LAN 6, and prints out an image based on the received image information.

If the facsimile function (or the Internet facsimile function) is executed, the multifunction copying device 1 transmits image information read from an original paper or received from a PC to a non-illustrated external facsimile device through a non-illustrated phone line (or the Internet N) or prints out an image based on image information received from an external facsimile device through a phone line (or the Internet N).

The multifunction copying device 1 is configured to permit only a user who is registered to the multifunction copying device 1 to use these functions, and prohibit a user who is not registered from using the functions. Hereinafter, the copying function among these functions is illustrated, and other functions are not described in detail. The user who is registered to the multifunction copying device 1 is referred to as a "registered user," and a user who is not registered is referred to as a "non-registered user." If not to be distinguished whether a user is registered or not, a word "user" is used to refer simply a general user.

As shown in FIG. 1, FIG. 2, FIG. 3, and FIG. 4, the multifunction copying device 1 is formed in an elongated box shape that stands on a floor, and comprises a paper conveying and reading unit 51, an image forming unit 52, a paper feeding unit 53, a paper discharge processing unit 54, and a displaying and operating unit 20. The image forming unit 52 and the paper discharge processing unit 54 are arranged side by side above the paper feeding unit 53. The paper conveying and reading unit 51 is arranged above the image forming unit 52 and the paper discharge processing unit 54. The displaying and operating unit 20 is arranged on a front side of the paper conveying and reading unit 51.

As shown in FIG. 4, the multifunction copying device 1 further comprises a CPU 10, a ROM 11, a RAM 12, an HDD (Hard Disc Drive) 3, an image processing unit 50 and an I/F (Interface) 56.

The I/F 56 is constituted with a USB. The multifunction copying device 1 is connected to the LAN 6 through the I/F 56, and is connected to the Internet N through the LAN 6.

The CPU 10 uses the RAM 12 as a working area, and controls each unit of the multifunction copying device 1 in accordance with control programs and data stored in the ROM 11 and data stored in the HDD 3 to execute various processes. For example, the CPU 10 temporarily stores, in the RAM 12, fingerprint information read by a later-described fingerprint processing unit 25, and uses the stored fingerprint information when the CPU 10 executes processes S14 and S34 (see FIGS. 5 and 6).

The HDD 3 is a large-volume storage device. A fingerprint registering unit 31 is provided in a part of a storage area of the HDD 3.

Fingerprint information of a user is registered (i.e., registered user) in the fingerprint registering unit 31 so as to be associated with a user ID provided to the registered user. It means that the fingerprint registering unit 31 functions as a registering unit. In other words, a user who corresponds to the fingerprint information registered to the fingerprint registering unit 31 is the registered user, and a user whose fingerprint information is not registered is the non-registered user. Here, the fingerprint information in this embodiment indicates the shape of the fingerprint. In addition, the user ID is user-specific identifying information using a number with a plurality of digits, alphabet(s), etc.

The displaying and operating unit 20 comprises a touch panel 2, a display control unit 23, an operation processing unit 24, a fingerprint processing unit 25 and an operating unit 26. The touch panel 2 has a liquid crystal display (LCD) panel 21, an operation accepting panel 22 laminated on an outer surface of the LCD panel 21 (in this embodiment, on an upper surface), and a non-illustrated backlight laminated on an inner surface of the LCD panel 21 (in this embodiment, on a lower surface).

The LCD panel 21 functions to display an operable screen image. For this reason, the LCD panel 21 has a pixel portion in each area equivalent to a pixel of the operable screen image, which is constituted with three TFTs (Thin Film Transistors) 211 for red, green, and blue. The pluralities of the pixel portions are two-dimensionally arranged on the LCD panel 21. Each of the TFTs 211 of the LCD panel 21 is connected to the display control unit 23. The display control unit 23 adjusts a voltage applied to each of the TFTs 211 to display the operable screen image constituted with a color image on the LCD panel 21.

The operation accepting panel 22 functions to accept a user operation. For this reason, transparent electrodes 221, each of which is constituted with ITO (Indium Tin Oxide), are two-dimensionally arranged on the operation accepting panel 22 corresponding to the pixel portions of the LCD panel 21, respectively, and are configured to provide an output result of each transparent electrodes 221 to the operation processing unit 24. Similarly, photodiodes 222 are two-dimensionally arranged on the operation accepting panel 22 corresponding to the TFTs 211 of the LCD panel 21, respectively, and are configured to provide a detected result of each of the photodiodes 222 to the fingerprint processing unit 25.

The transparent electrodes 221 of the operation accepting panel 22 function as contact sensors for detecting that a finger of a user contacts the operation accepting panel 22 (i.e., that the user operates the multifunction copying device 1). Specifically, the user touches the touch panel 2 (more particularly, the operation accepting panel 22) with own finger, and then it changes an electrical capacity between the transparent electrodes 221 (one conductive body) and the user's finger (the other conductive body). The operation processing unit 24 detects the change in the electrical capacity of each of the transparent electrodes 221, and then provides the detected results to the CPU 10.

Predetermined soft keys are provided to the operation accepting panel 22 corresponding to the operable screen image displayed on the LCD panel 21. The soft keys are associated with predetermined regions of the operation accepting panel 22, and each of the soft keys corresponds, in advance, to a predetermined process to be executed when the soft key is selected by the user (e.g., a density setting process for setting a density of the image to be printed out). The CPU 10 identifies the soft key that the user selects through the operation accepting panel 22, based on the detected result provided from the operation processing unit 24, and then executes the process corresponding to the identified soft key (in this case, the density setting process). It means that the CPU 10 functions as a processing unit.

Alternatively, instead of utilizing the change in the electrical capacity, the soft key may be configured with utilizing a pressure change, optical change, ultrasonic wave change, etc.

The CPU 10 provides a reading execution signal for instructing the fingerprint processing unit 25 to execute reading the fingerprint information, after receiving the detected result from the operation processing unit 24.

When the user's finger contacts the operation accepting panel 22, the finger reflects a light illuminated from the backlight of the touch panel 2, and one or some of the photodiodes 222 receive the light reflected from the user's finger. The photodiode(s) 222 that has received the light reflected from the user's finger differs in photoelectromotive force level from the photodiode(s) 222 that has not received the reflected light. In addition, the photodiode(s) 222 that has received the light reflected from a convex portion of the user's fingerprint differs in photoelectromotive force level from the photodiode(s) 222 that has received the light reflected from a concave portion of the user's fingerprint. The photodiodes 222 provide information about own High/Low level of the photoelectromotive as the detected results to the fingerprint processing unit 25.

The fingerprint processing unit 25 generates the fingerprint information of the user, based on the detected results of the photodiodes 222 provided from the operation accepting panel 22, after receiving the reading execution signal from the CPU 10. It means that the fingerprint processing unit 25 functions as a reading unit for reading the fingerprint information of the user who selects an operation thorough the operation accepting panel 22. The photodiodes 222 may be configured to be used as the above-described contact sensors to provide these detected results to the operation processing unit 24, instead of the transparent electrodes 221.

Meanwhile, the fingerprint information registered to the fingerprint registering unit 31 is, for example, fingerprint information read by the fingerprint processing unit 25 through the operation accepting panel 22 when a finger of the non-registered user touches the touch panel 2 for fingerprint registration process. At this point, an entire fingerprint of the user is preferably read.

As shown in FIG. 3, an operating unit 26 comprises hard keys, such as a start key 261, a numerical keypad 262, and various function keys 263. Each of the hard keys of the operating unit 26 is associated, in advance, with a process to be executed when the hard key is selected. For example, the start key 261 is associated with an execution starting process to start an execution of the reading process for reading the image information from the original paper. If the user operates through the operating unit 26, the CPU 10 then identifies the hard key selected by the user in the operating unit 26, and then executes the process corresponding to the identified hard key (in this case, the execution starting process).

In the displaying and operating unit 20 such as described above, for example, the LCD panel 21 of the touch panel 2 displays the operable screen image comprising an operating status of the multifunction copying device 1, an input instruction given to the user, images indicating a location of the soft keys provided in the operating unit 26, and so on. The user operates the multifunction copying device 1 through the operation accepting panel 22 and/or the operating unit 26, while viewing the LCD panel 21.

In this embodiment, first of all, a user who desires to use the multifunction copying device 1 performs a fingerprint authentication procedure for log-in. For this reason, the LCD panel 21 displays an operable screen image of the log-in for the registered user.

The registered user can log-in to the multifunction copying device 1, and the registered user who has logged in is allowed to use the multifunction copying device 1 until the registered user logs out. Once a first registered user has logged in, the other registered users cannot log-in until the first registered user logs out. It means that the registered user who does not log-in is prohibited from using the multifunction copying device 1.

Non-registered users is impossible to log-in and, thus, the non-registered user is prohibited from using the multifunction copying device 1.

Hereinafter, a registered user who has logged in (i.e., a user who is allowed to use the multifunction copying device 1) is referred to as an "authenticated user," and the user who does not log-in (i.e., a user who is prohibited from using the multifunction copying device 1) is referred to as an "non-authenticated user."

Figure 5:
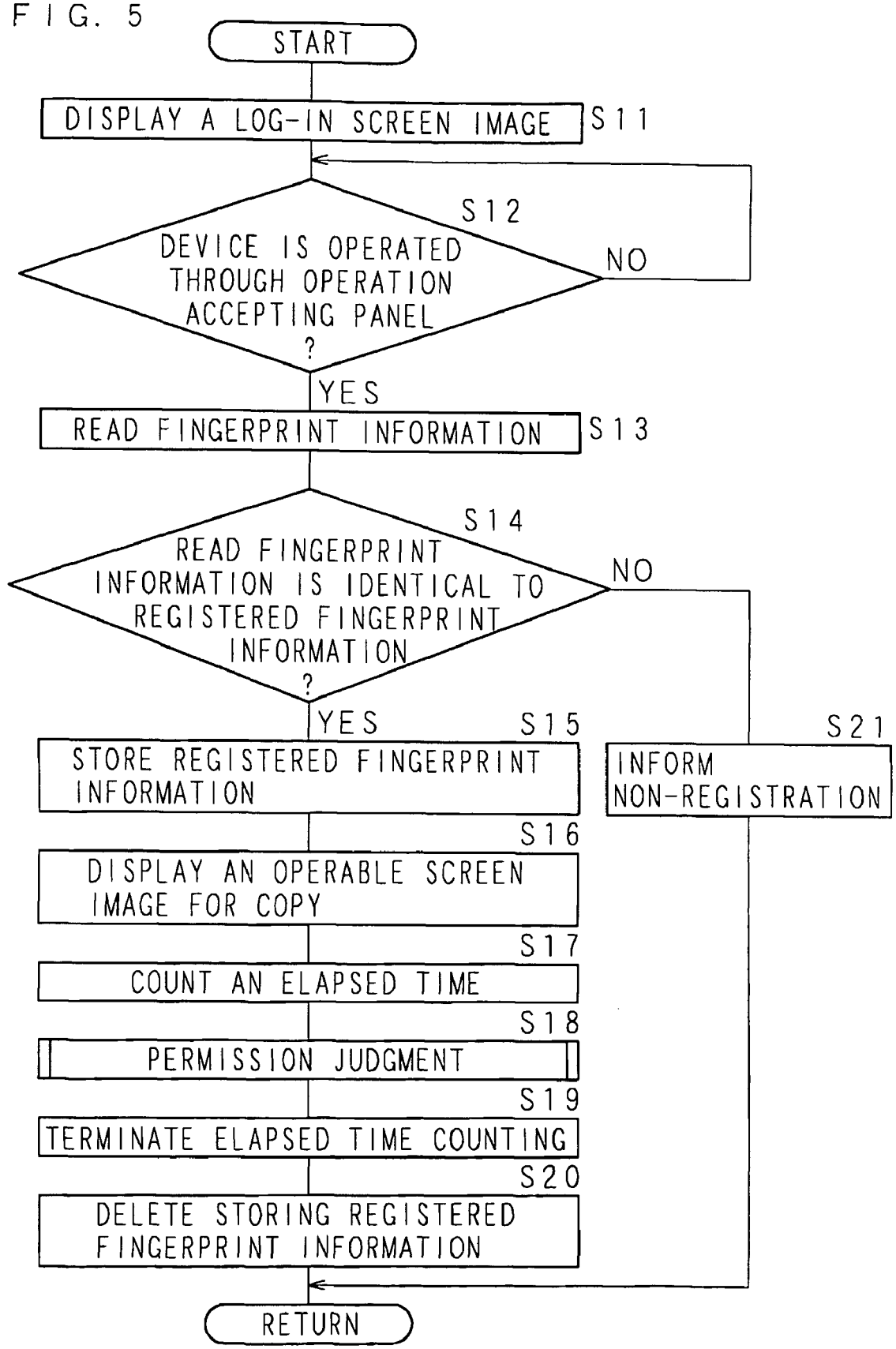
FIG. 5 is a flowchart showing procedures of a log-in process to be executed by a CPU of the copying device with multifunction according to Embodiment 1 of the present invention.

FIG. 5 is a flowchart showing procedures of the log-in process to be executed by the CPU of the multifunction copying device according to Embodiment 1 of the present invention.

The CPU 10 controls the display control unit 23 to display a log-in screen image on the LCD panel 21 (S11), and, the CPU 10 judges whether the detected result is provided from the operation processing unit 24 to detect whether the user operates the multifunction copying device 1 through the operation accepting panel (S12). If the user does not operate the multifunction copying device 1 through the operation accepting panel ("NO" at S12), the process S 12 is repeatedly executed, while the CPU 10 controls to display the log-in screen image. Although not illustrated herein, while displaying the log-in screen image, the CPU 10 prevents from executing various processes even if the user selects the hard key of the operating unit 26.

If the user operates the multifunction copying device 1 through the operation accepting panel 22 ("YES" at S12), the CPU 10 provides the reading execution signal to the fingerprint processing unit 25 to cause the fingerprint processing unit 25 to read the fingerprint information from the operation accepting panel 22 (S13) and to cause the RAM 12 to store temporarily the read fingerprint information.

In addition, the CPU 10 judges whether the fingerprint information that is read from the operation accepting panel 22 by the fingerprint processing unit 25 (hereinafter, referred to as "read fingerprint information") is identical to any one of the fingerprint information registered to the fingerprint registering unit 31 (hereinafter, referred to as "registered fingerprint information"), for detecting whether the user who operates the multifunction copying device 1 through the operation accepting panel 22 is the registered user who has logged in during the log-in screen image display or the non-registered user (S14). It means that the CPU 10 judges whether the read fingerprint information is registered. The CPU 10 at S14 functions as a registering judgment unit.

If the read fingerprint information and the registered fingerprint information are identical ("YES" at S14), the user who operates the multifunction copying device 1 through the operation accepting panel 22 at S12 is the registered user. Therefore, the CPU 10 exclusively stores in the RAM 12 the registered fingerprint information that is judged at S14 to be identical to the read fingerprint information (S15). The CPU 10 at S15 functions as a storage control unit.

At the process S15, the RAM 12 functions as a fingerprint storage unit for storing one registered fingerprint information. If the RAM 12 already stores a registered fingerprint information before executing the process S15 (e.g., the RAM 12 keeps to store an old registered fingerprint information at a previous log-in process without deletion), the registered fingerprint information that is already stored is overwritten with the new registered fingerprint information.

After the completion of the process S15, the CPU 10 controls the display control unit 23 to display an operable screen image for using the copying function (hereinafter, referred to as an "operable screen image for copy") on the LCD panel 21 (S16). Then, the CPU 10 starts to count an elapsed time since the operation accepting panel 22 has accepted the operation (S17). At S17, the CPU 10 counts the elapsed time since the user operates the multifunction copying device 1 through the operation accepting panel 22 at S12. For counting the elapsed time, the CPU 10, for example, may activate a non-illustrated timer, or may count the number of clocks inputted to the CPU 10.

The screen image comprises a soft key corresponding to a log-out process to log out from the multifunction copying device 1, while displaying the operable screen image for copy. The registered user may select this soft key to log-out after the copying is finished.

When corresponding to the registered fingerprint information stored in the RAM 12 at S15, the registered user is treated as the authenticated user. Hereinafter, this registered fingerprint information (i.e., the registered fingerprint information of the authenticated user) is referred to as "authenticated fingerprint information." Although not illustrated, if the registered user operates the multifunction copying device 1 through the hard key after the completion of the process S15, the CPU 10 executes the process corresponding to the selected hard key.

The CPU 10 needs to execute a process corresponding to the operation of the authenticated user, and to inhibit a process corresponding to the operation of the non-authenticated user. For this reason, after the completion of the process S17, the CPU 10 invokes a subroutine for performing a permission judgment process to judge whether an execution of the process is permitted (refer to FIG. 6), and then executes the subroutine (S18).

After the completion of the process S18, the CPU 10 terminates the counting of the elapsed time that has been started at S17 (S19), and deletes the registered fingerprint information stored in the RAM 12 at S15 (S20). In the result, the authenticated user is logged out from the multifunction copying device 1. After the completion of the process S20, the CPU 10 returns the process to S11, and displays the log-in screen image again.

If the read fingerprint information and the registered fingerprint information are not identical ("NO" at S14), the user who operates the multifunction copying device 1 through the operation accepting panel 22 at S12 is the non-registered user. Therefore, the CPU 10 informs this non-registered user that the use of the multifunction copying device 1 is not permitted because the multifunction copying device 1 does not register the user who operates the apparatus through the operation accepting panel 22 (S21), and then the CPU 10 returns the process to S11. At S21, the CPU 10 controls the display control unit 23 to display a message, "a non-registered user cannot use." In the result, the multifunction copying device 1 prevents the non-registered user from using the multifunction copying device 1, and thus improves own security. In addition, the non-registered user can recognize a reason why the use is prohibited.

Figure 6:
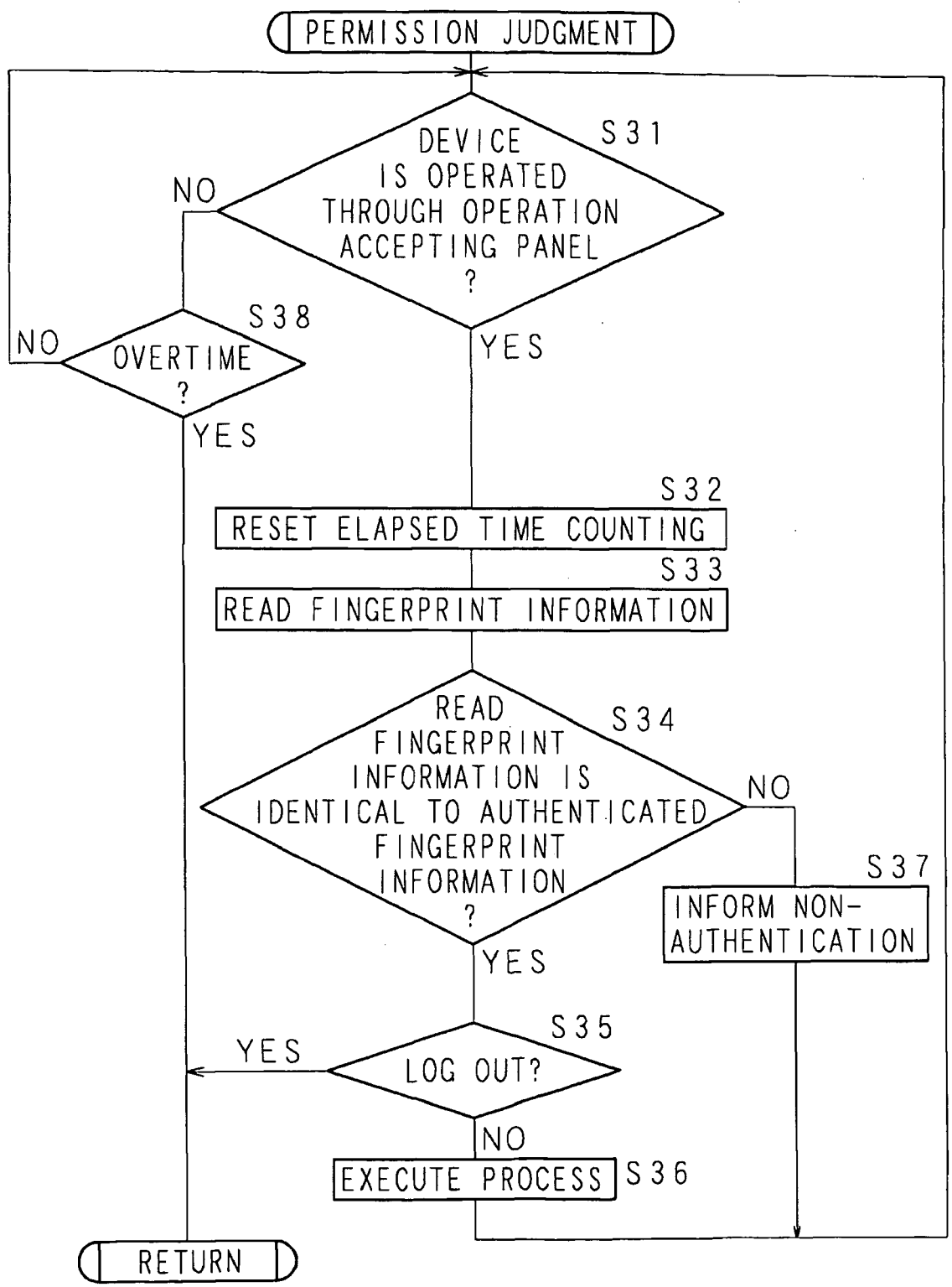
FIG. 6 is a flowchart showing a subroutine of the permission judgment process to be executed by the CPU of the copying device with multifunction according to Embodiment 1 of the present invention.

FIG. 6 is a flowchart showing a subroutine of the permission judgment process to be executed by the CPU of the multifunction copying device according to Embodiment 1 of the present invention.

The CPU 10 judges whether the detected result is provided from the operation processing unit 24 to detect whether the user operates the multifunction copying device 1 through the operation accepting panel 22 (S31). If the user operates the multifunction copying device 1 through the operation accepting panel 22 ("YES" at S31), the CPU 10 resets the counting result of the elapsed time since the user has operated the multifunction copying device 1 through the operation accepting panel 22, to "0" (S32). The CPU 10 further provides the reading execution signal to the fingerprint processing unit 25, causes the fingerprint processing unit 25 to read the fingerprint information from the operation accepting panel 22 (S33), and then causes the RAM 12 to store temporarily the read fingerprint information.

The CPU 10 further judges whether the read fingerprint information at S33 and the authenticated fingerprint information stored in the RAM 12 are identical to detect whether the user who operates the multifunction copying device 1 through the operation accepting panel 22 during displaying the operable screen image for copy is the authenticated user or the non-authenticated user (S34). Because the process S34 is executed each time when the fingerprint processing unit 25 reads fingerprint information (i.e., every time when the process S31 is "YES"), the CPU 10 at S34 functions as a identity judgment unit.

If the read fingerprint information and the authenticated fingerprint information are identical ("YES" at S34), the CPU 10 identifies the soft key selected by the authenticated user based on the detected result provided from the operation processing unit 24 at S31, and then judges whether the identified soft key corresponds to the log-out process (S35). If the identified soft key corresponds to the process other than the log-out process ("NO" at S35), the CPU 10 executes the process corresponding to the user selection (S36). It means that the multifunction copying device 1 executes the process in accordance with the operation accepted from the operation accepting panel 22. After the completion of the process S36, the CPU 10 returns the process to S31.

In addition, the multifunction copying device 1 can identify the own usage status with storing, in the HDD 3, e.g. contents of the process and execution time so as to correspond to the user ID registered to the fingerprint registering unit 31 in the association with the authenticated fingerprint information.

On the other hand, if the identified soft key corresponds to the log-out process ("YES" at S35), the CPU 10 terminates the subroutine of the permission judgment process to return the process to the main routine. It means that the multifunction copying device 1 does not execute the process in accordance with the operation accepted from the operation accepting panel 22. At this point, the processes S19 and below are executed to log-out the authenticated user, and the log-in screen image is displayed on the operation accepting panel 22.

If the read fingerprint information and the authenticated fingerprint information are not identical ("NO" at S34), the user who operates the multifunction copying device 1 through the operation accepting panel 22 at S31 is the non-authenticated user. Therefore, the CPU 10 informs this non-authenticated user that the use of the multifunction copying device 1 is not permitted because the multifunction copying device 1 does not register the user who operates the apparatus through the operation accepting panel 22 (S37), and then the CPU 10 returns the process to S31. At S37, the CPU 10 controls the display control unit 23 to display a message, e.g. "a non-registered user cannot use." In the result, the multifunction copying device 1 prevents the non-registered user from using the multifunction copying device 1, and thus improves own security. In addition, the non-registered user can recognize a reason why the use is prohibited.

If the user does not operate the multifunction copying device 1 through the operation accepting panel 22 ("NO" at S31), the CPU 10 then judges whether the elapsed time since the user operates the multifunction copying device 1 through the operation accepting panel 22 at S12 or S31 passes a predetermined time (i.e., overtime: S38). If it is judged to be non-overtime ("NO" at S38), the CPU 10 returns the process to S31 because the authenticated user is still using the multifunction copying device 1. If it is judged to be overtime ("YES" at S38), the CPU 10 terminates the subroutine of the permission judgment process to return the process to the main routine, because the operation accepting panel 22 has not been touched for a long time and it seems that the authenticated user does not use the multifunction copying device 1. At this point, the processes S19 and below are executed to log out the authenticated user automatically, and then touch panel 2 displays the log-in screen image on the operation accepting panel 22.

The overtime judgment whether the predetermined time passes since the user has operated the multifunction copying device 1 through the operation accepting panel 22 (S38) and the log-out judgment whether the authenticated user selects the soft key corresponding to the logout process (S35) judge, in other words, whether it establishes the predetermined condition that a use of the copying device with multifunction 1 is terminated. It means that the CPU 10 at S35 and S38 functions as a condition judgment unit. If the CPU 10 judges to be "YES" at S35 and S38 (i.e., if the predetermined condition is established), the CPU 10 terminates the subroutine of the permission judgment process to execute the processes S19 and S20. Further, the CPU 10 returns the process to S11, and then allows executing the process S14. On the other hand, if the CPU 10 judges to be "NO" at S35 and S38 (i.e., the predetermined condition is not established), the CPU 10 inhibit executing the process S14 to maintain the execution of the permission judgment process.

Meanwhile, for executing the process S14 (or S34), the CPU 10 performs a pattern matching between the read fingerprint information and the registered fingerprint information (or the authenticated fingerprint information). The CPU 10 may perform comparison, with use of a feature quantity indicating a feature of the fingerprint shape obtained from the fingerprint information, between the read fingerprint information and the registered fingerprint information (or the authenticated fingerprint information).

The CPU 10 calculates a degree of coincidence indicating how much the read fingerprint information matches the registered fingerprint information (or the authenticated fingerprint information), using the pattern matching technique or the feature quantity comparison technique. If the calculated degree of coincidence is greater than a predetermined degree of coincidence, the CPU 10 then judges that the read fingerprint information is identical to the registered fingerprint information (or the authenticated fingerprint information). On the other hand, if the obtained degree of coincidence is less than the predetermined degree of coincidence, the CPU 10 then judges that the read fingerprint information is not identical to the registered fingerprint information (or the authenticated fingerprint information).

However, the shape of the fingerprint shown by the read fingerprint information does not need to exactly match the shape of the fingerprint shown by the registered fingerprint information (or the authenticated fingerprint information). The reason is that, even if the user operates with a same finger, it is very likely that the touching range, area or the like on the operation accepting panel 22 differs each time when the finger touches the operation accepting panel 22 to operate. In addition, it is very likely that, even if the registered fingerprint information represents the shape of the entire fingerprint, the read fingerprint information may represents only a part of the shape of the entire fingerprint. For similar reasons, the RAM 12 preferably stores the registered fingerprint information, not the read fingerprint information, as the authenticated fingerprint information.

According to the multifunction copying device 1 described above, during the use of the authenticated user (i.e., during the log-in of the first registered user), the other user who is not the authenticated cannot use the multifunction copying device 1 even if this the other user is registered. For this reason, the registered user who does not log-in needs to log-in to the multifunction copying device 1 again, after the authenticated user terminates to use the multifunction copying device 1 (the log-out or the overtime). Therefore, the multifunction copying device 1 can realize a significantly high security and strict management of the use.

It may not be limited to the configuration that the authenticated fingerprint information is stored in the RAM 12. For example, it may be configured that a flag is set to the registered fingerprint information being identical to the read fingerprint information in the fingerprint registering unit 31, other flag(s) for the other registered fingerprint information is reset, and the registered fingerprint information set the flag is utilized as the authenticated fingerprint information. In this case, the fingerprint registering unit 31 functions as a registering unit, as well as a fingerprint storing unit.

In addition, the fingerprint storing unit may be configured to store a plurality of fingerprint information, not one fingerprint information. In this case, the fingerprint registering unit 31 functions as the fingerprint storing unit. The process S15 is not executed, and then the CPU 10 judges whether the read fingerprint information is identical to any one of the registered fingerprint information at S34. In short, the registered fingerprint information means the authenticated fingerprint information, the registered user means the authenticated user, and, during log-in of the first registered user, the other user may be able to use the multifunction copying device 1. However, the fingerprint information is read at each finger touch of the operation accepting panel 22 to operate. Therefore, the multifunction copying device 1 can perform the management of usage as the HDD 3 stores the content of the process, the execution time, etc. corresponding to the user ID associated with the registered fingerprint information being identical to the read fingerprint information. On the other hand, because the non-registered user means the non-authenticated user, the multifunction copying device 1 prevents from using and maintains the security.

If the CPU 10 judges to be "NO" at S34, the multifunction copying device 1 may be configured not only to execute the process S37, but also to inform to the authenticated user that a non-authenticated user desires to use the multifunction copying device 1. Because the informed authenticated user can log-out from the multifunction copying device 1 to switch to the non-authenticated user, the multifunction copying device 1 can be smoothly shared.

Finally, it is described about an operation of the multifunction copying device 1 when an original paper is copied (refer to FIGS. 1-4).

When an original paper is copied, a user sets the original paper onto a paper set tray 51*a* of the paper conveying and reading unit 51. At this point, a paper detecting sensor 51*b* detects the set original paper. The authenticated user sets a size of the recording paper, a variable magnification, etc., and then selects the start key 261 to operate through the displaying and operating unit 20.

When the authenticated user selects the start key 261, the paper conveying and reading unit 51 pulls the original paper on the paper set tray 51*a* singly into a casing of the paper conveying and reading unit 51 by a pick-up roller 51*c*. Then, the paper conveying and reading unit 51 passes the original paper between a separating plate 51*d* and a conveying roller 51*e* to send out onto a platen glass 51*f*, and conveys the original paper on the platen glass 51*f* in a sub-scanning direction to discharge the paper onto a paper discharging tray 51*g*.

At this point, a first reading unit 511 reads a surface (under surface) of the original paper. The first reading unit 511 moves a first scanning unit 51*h* to a predetermined reading start position for position setting, and sets a second scanning unit 51*i* to a predetermined position. Furthermore, the first reading unit 511 illuminates the surface of the original paper with an exposure lump of the first scanning unit 51*h* through the platen glass 51*f*, leads a reflected light from the original paper to an imaging lens 51*j* by reflecting mirrors of the first and second scanning units 51*h* and 51*i*, focuses the reflected light from the original paper to a CCD (Charge Coupled Device) 51*k* by the imaging lens 51*j*, and then forms on the CCD 51*k* an image of the surface of the original paper to read the image.

A second reading unit 512 reads a back surface (upper surface) of the original paper. The second reading unit 512 is arranged above the platen glass 51*f*, and comprises an exposure lump for illuminating the back surface of the original paper (e.g., an LED (Light Emitting Diode) array, a fluorescent lamp, etc.), a SELFOC lens array arranged per pixel for focusing the reflected light from the original paper, a contact image sensor (CIS) for photoelectrically converting the reflected light from the original paper received through the SELFOC lens array and outputting an analog image signal.

The user can open an upper portion of the casing of the paper conveying and reading unit 51 and places the original paper on the platen glass 51f to read the surface of the original paper. In this case, the first and second scanning units 51h and 51i maintain a predetermined relative speed between them, while moving in the sub-scanning direction. The first scanning unit 51h exposes to the original paper on the platen glass 51f, the first and second scanning units 51h and 51i leads the reflected light from the original paper to the imaging lens 51j, and the imaging lens 51j then forms on the CCD 51k the image of the original paper.

As described above, after one surface or both surfaces of the original paper is read, the read image information is inputted to the image processing unit 50 that is constituted with an ASIC (Application Specified Integrated Circuit). Then, the image processing unit 50 applies various types of image processes to the read image information and then outputs the applied image information to the image forming unit 52.

The image forming unit 52 comprises a photoreceptor drum 52a, a charging device 52b, a laser scanning unit 52c, a developing device 52d, a transcribing device 52e, a cleaning device 52f, a non-illustrated electricity removing device, and a fixing device 52g, to print out the image of the original paper indicated by the image information.

The image forming unit 52 further comprises a main conveying path 52h and a reverse conveying path 52i, and conveys a recording paper fed from the paper feeding unit 53 along the main conveying path 52h. The paper feeding unit 53 pulls out singly the recording paper stored in any of paper cassettes 53a, 53b, and 53c, or placed on a manual feeding tray 53d, and then the paper feeding unit 53 sends out the pulled recording paper to the main conveying path 52h of the image forming unit 52.

In the process of conveying the recording paper along the main conveying path 52h of the image forming unit 52, the recording paper passes between the photoreceptor drum 52a and the transcribing device 52e. Then, the recording paper further passes through the fixing device 52g to obtain the image. The photoreceptor drum 52a rotates in a single direction. A surface of the photoreceptor drum 52a is cleaned by the cleaning device 52f and the electricity removing device, and then uniformly charged by the charging device 52b.

The laser scanning unit 52c modulates a laser light based on the image information from the paper conveying and reading unit 51, and repeatedly scans, with the modulated laser light, the surface of the photoreceptor drum 52a in a main scanning direction to form an electrostatic latent image on the surface of the photoreceptor drum 52a. The developing device 52d forms a toner image on the surface of the photoreceptor drum 52a, as supplying a toner onto the surface of the photoreceptor drum 52a to develop the electrostatic latent image. The transcribing device 52e transcribes the toner image on the surface of the photoreceptor drum 52a onto the recording paper passing between the transcribing device 52e and the photoreceptor drum 52a. The fixing device 52g heats and pressurizes the recording paper to fix the toner image on the recording paper.

A branching claw 53e is arranged at a connecting position of the main conveying path 52h and the reverse conveying path 52i.

If printing out on only one surface of the recording paper, the branching claw 53e is set to a position to lead the recording paper from the fixing device 52g toward a discharged paper tray 53f or toward the paper discharge processing unit 54.

On the other hand, if printing out on the both surfaces of the recording paper, the branching claw 53e is set to another position to lead the recording paper toward the reverse conveying path 52i. The recording paper led to the reverse conveying path 52i passes through the reverse conveying path 52i. The front and back surfaces of the recording paper is reversed and conveyed to the main conveying path 52h again. In the process of re-conveying through the main conveying path 52h, the back surface obtains an image. Then, the recording paper is led toward the discharged paper tray 53f or the paper discharge processing unit 54.

The recording paper obtained the image, as described above, is discharged to the discharged paper tray 53f, or to any of discharged paper trays 54a of the paper discharge processing unit 54.

The paper discharge processing unit 54 may be configured to sort a plurality of the recording paper to each of the discharged paper trays 54a, apply a punching process to each recording paper, and apply a stapling process to each recording paper. For example, if preparing a plurality of copies of prints, the paper discharge processing unit 54 sorts the recording papers to the discharged paper trays 54a, so that one copy of the prints is assigned to each of the discharged paper trays 54a. With respect to each of the discharged paper trays 54a, the paper discharge processing unit 54 applies the punching process, the stapling process, and the like to the recording papers on the discharged paper trays 54a to prepare the prints.

Embodiment 2

Figure 8A:
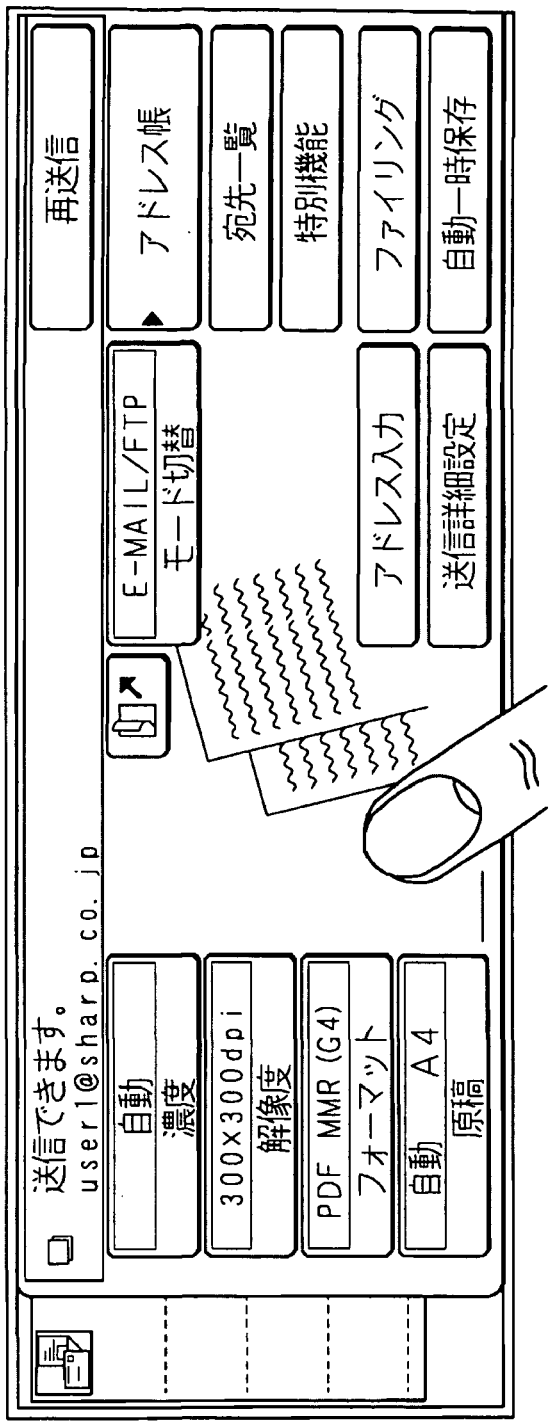
FIGS. 8A and 8B are schematic views showing examples of operable screen images displayed on touch panel of the copying device with multifunction according to Embodiment 2 of the present invention.
Figure 8B:
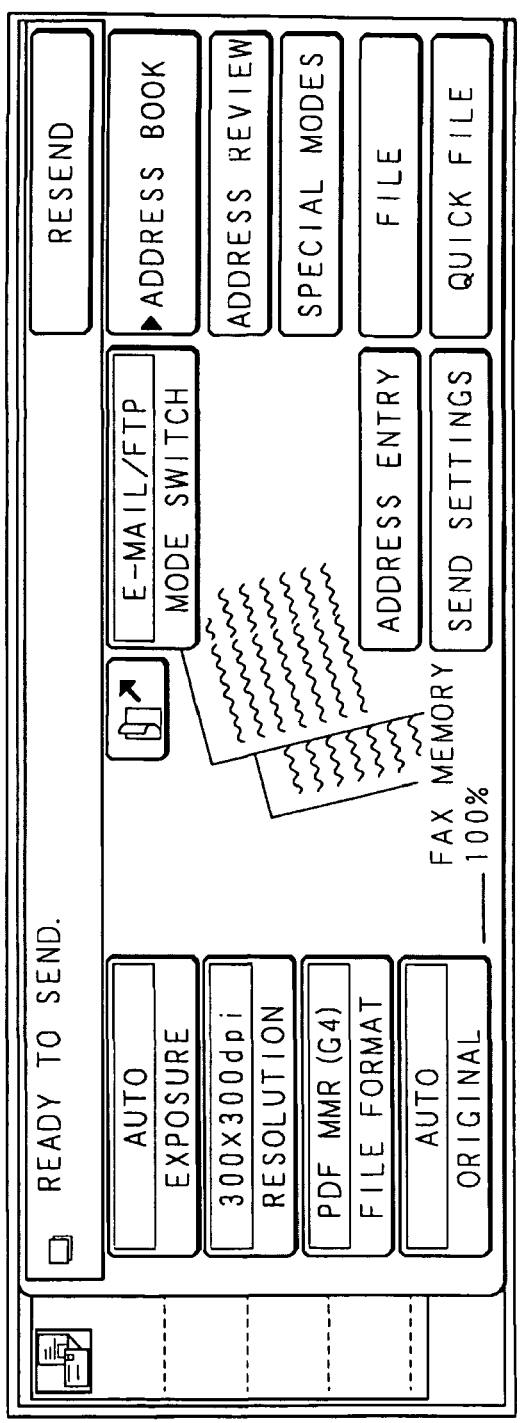

FIG. 7 is a block diagram showing a configuration of major portions of a multifunction copying device 1 as an processing apparatus according to Embodiment 2 of the present invention, and FIGS. 8A and 8B are schematic views showing examples of operable screen images displayed on an LCD panel of the multifunction copying device according to Embodiment 2 of the present invention.

The multifunction copying device 1 of Embodiment 2 has approximately a similar configuration to the multifunction copying device of Embodiment 1 (refer to FIG. 4). However, the multifunction copying device 1 of Embodiment 2 further comprises a fingerprint registering unit 31 provided in one portion of a storage area of a HDD 3, and a screen image storage unit 32 provided in the other portion of the storage area of the HDD 3. To the portions in Embodiment 2 corresponding to those in Embodiment 1, the same reference numerals are applied and thus these descriptions for the same reference numerals are omitted.

The screen image storage unit 32 stores a user ID for the registered user, and a display language information indicating a language used in the operable screen image (hereinafter, referred to as a "display language") to be displayed on the LCD panel 21 when this registered user uses the multifunction copying device, so as to be associated with each other. The display language is, for example, a native language, or a mainly utilized language, etc. of the registered user. If the screen image storage unit 32 stores display language information indicating Japanese (or English) as the display language information, the operable screen image is displayed with e.g. words and messages that are written in Japanese characters (or English characters).

The display control unit 23 displays the operable screen image written in Japanese characters as shown in FIG. 8A (or English characters as shown in FIG. 8B) on the LCD panel 21 based on an operable screen image information indicating the operable screen image with the language corresponding to the display language information. Although the operable screen image to use the facsimile function (hereinafter, referred to as an "operable screen image for facsimile") is illustrated in FIGS. 8A and 8B, it may be configured that e.g. the operable screen image for copy and the operable screen image for using the network printer function are also similarly written in Japanese or English characters.

As described above, the fingerprint information registered to the fingerprint registering unit 31 are associated with the operable screen image to be displayed on the LCD panel 21 via the user ID. It means that a combination of the fingerprint registering unit 31 and the screen image storage unit 32 functions as a screen image storage unit, and that the display control unit 23 functions as a display control unit.

In addition, the fingerprint registering unit 31 may be configured to register the fingerprint information directly associated with the display language information, instead of providing the screen image storage unit 32.

Figure 9:
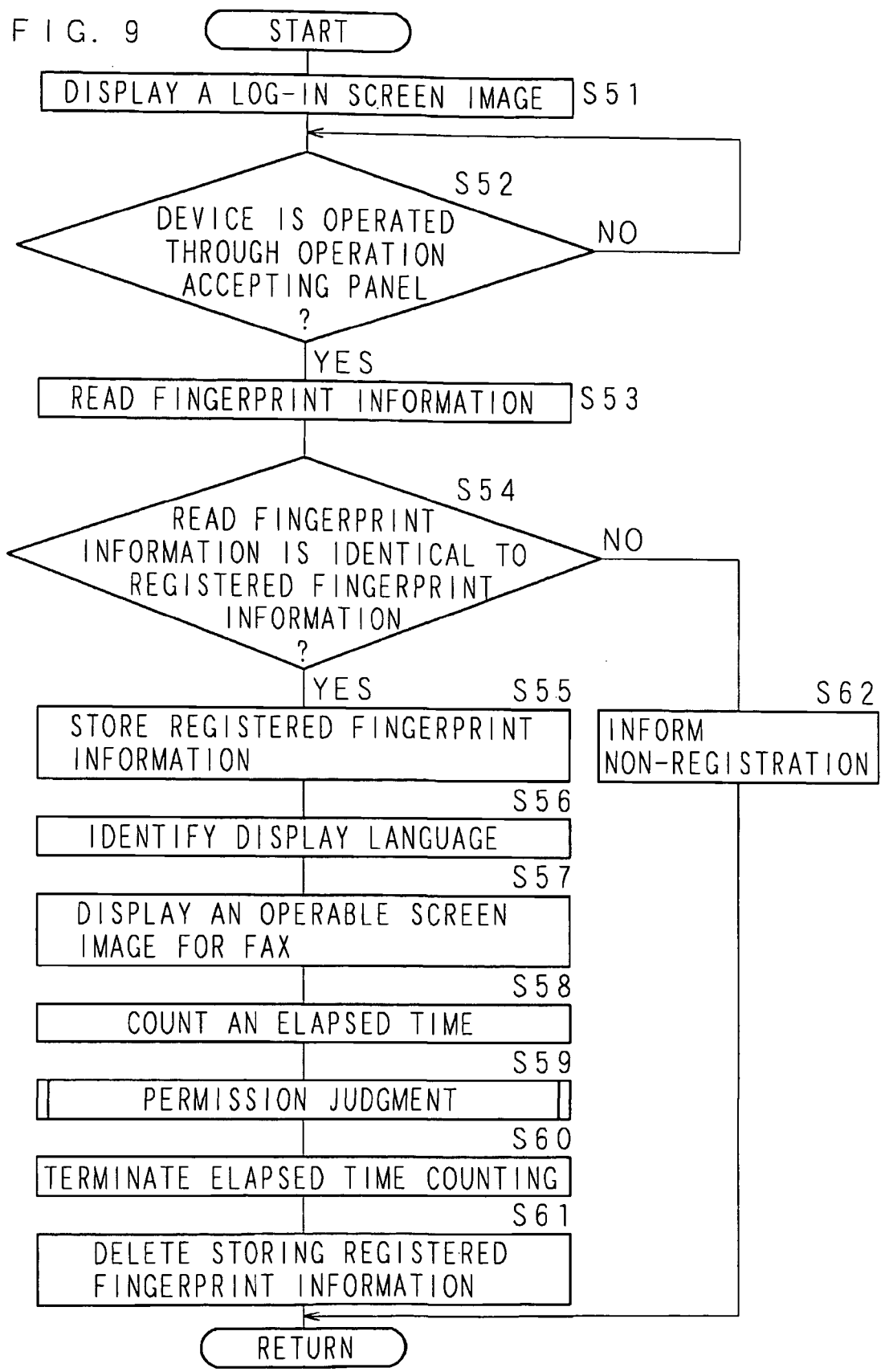
FIG. 9 is a flowchart showing procedures of a log-in process executed by a CPU of the copying device with multifunction according to Embodiment 2 of the present invention.

FIG. 9 is a flowchart showing procedures of a log-in process to be executed by a CPU of the multifunction copying device according to Embodiment 2 of the present invention. The processes S51-S55 and S58-S62 of the log-in process of this embodiment correspond to the processes S11-S15 and S17-S21 of the log-in process of Embodiment 1 shown in FIG. 5. The descriptions thereof are omitted.

After the completion of the process S55, the CPU 10 refers to user ID and registered fingerprint information stored in the fingerprint registering unit 31, then identifies the user ID associated with the authenticated fingerprint information stored in the RAM 12 at S55 (i.e., the registered fingerprint information that is identical to the fingerprint information read by the fingerprint processing unit 25 at S53). Furthermore, the CPU 10 refers to user ID and display language information stored in the screen image storage unit 32, and then identifies the display language information associated with the identified user ID (S56). Then, the CPU 10 controls the display control unit 23 to display, on the LCD panel 21, the operable screen image for facsimile as shown in FIG. 8A or 8B that is written in the display language indicated by the display language information identified at S56 (S57), and executes process S58.

The multifunction copying device 1 as described above can realize to display the appropriate operable screen image for each of the authenticated users even if a different registered user logs in, while keeping the significantly high security and the strict management of use. Therefore, the multifunction copying device 1 improves convenience for the authenticated user.

The Embodiment 2 is not limited to the configuration in which the display language of the operable screen image is changed in accordance with the native language, the utilized language, etc. of the registered user, as described above. For example, it may be configured that a character size, a contrast, writing in Kanji characters or Hiragana characters, etc. may be changed in accordance with age and eyesight of the registered user. In addition, it may be configured that the operable screen image comprises contents to be informed to this registered user, such as number of use that the registered user has utilized the multifunction copying device 1, billing, and so on.

It may also be configured that the operable screen image comprises an input instruction to use a permitted additional function as well as a soft key to use this permitted additional function, depending on whether the user is e.g. a general user or an administrator. Similarly, it may be configured that the operable screen image is changed in accordance with a main usage pattern of the registered user (e.g., color/black-and-white, high/low of image quality, whether the copying function or the facsimile function is used, etc.), and that various settings corresponding to this usage pattern are set as default.

Embodiment 3

Figure 10:
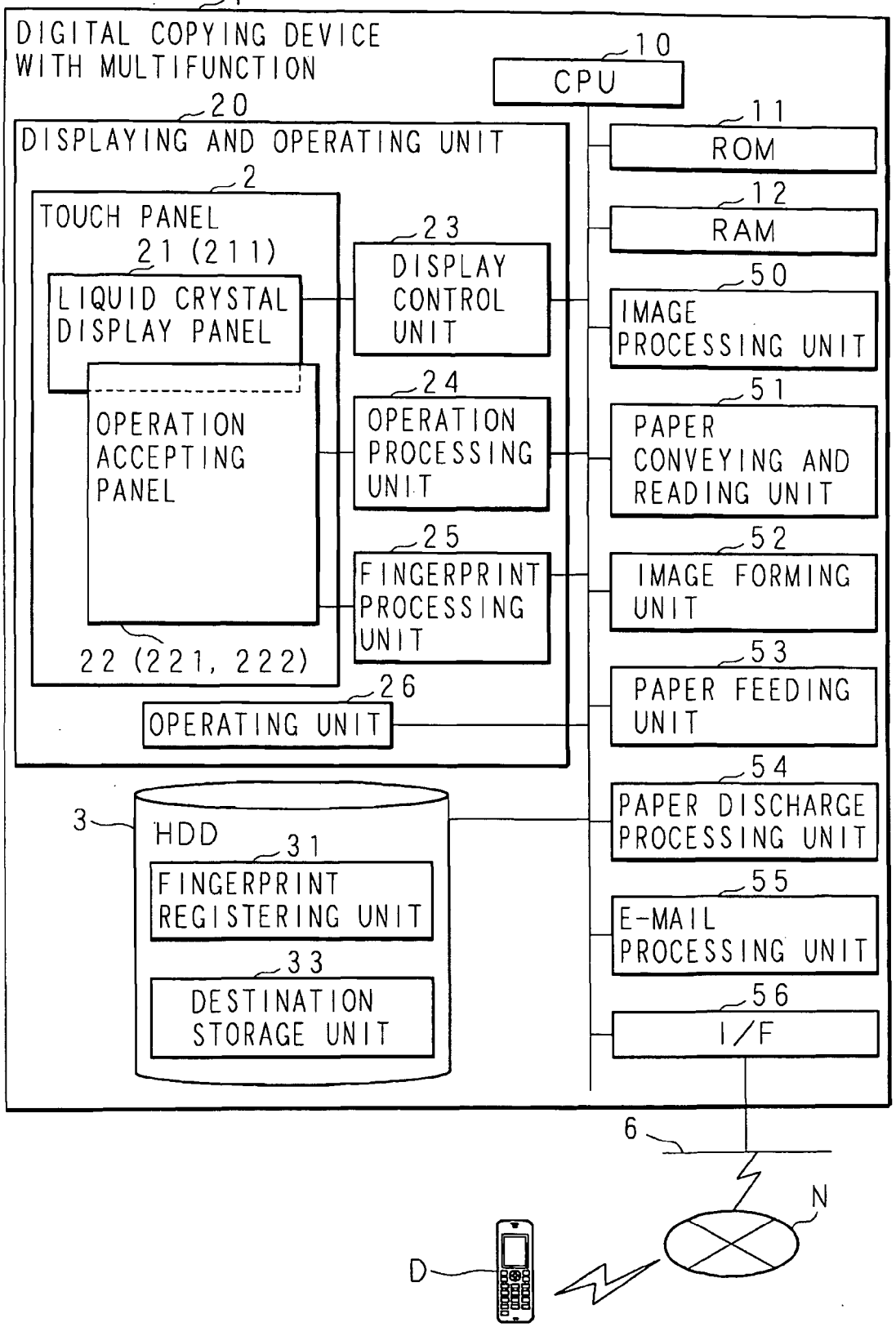
FIG. 10 is a block diagram showing a configuration of major portions of a copying device with multifunction as a processing apparatus according to Embodiment 3 of the present invention.

FIG. 10 is a block diagram showing a configuration of major portions of a multifunction copying device as a processing apparatus according to Embodiment 3 of the present invention.

The multifunction copying device 1 of the Embodiment 3 has approximately a similar configuration to the multifunction copying device of Embodiment 1 (refer to FIG. 4). However, the multifunction copying device 1 of the Embodiment 3 further comprises an e-mail processing unit 55 and a destination storage unit 33 provided in the other portion of the storage area of the HDD 3. The same reference numerals are applied to the portions corresponding to those in Embodiment 1 and, thus, these descriptions are omitted.

If a non-authenticated user operates through the operation accepting panel 22, the multifunction copying device 1 of Embodiment 1 informs the non-authenticated user that the use of the multifunction copying device 1 is not permitted, and then subsequently accepts an operation of the authenticated user (refer to FIG. 6).

On the other hand, if the non-authenticated user operates through the operation accepting panel 22, the multifunction copying device 1 of the Embodiment 3 invalidates the process corresponding to the operation of the authenticated user, and then returns the operable screen image to the log-in screen image set as the default screen image. At this point, the authenticated user is forced to log-out. Furthermore, the multifunction copying device 1 informs the authenticated user that the process desired by the authenticated user is invalidated because the non-authenticated user has operated through the operation accepting panel 22, and that the authenticated user is forced to log-out.

In the Embodiment 3, the process to be invalidated may represents various processes, such as a density setting process, a number setting process to be copied, and so on (hereinafter, referred to as a "setting change process"). The operable screen image reflecting the processed result of the setting change process, that is a changed setting operable screen image desired by the authenticated user, is returned to the default setting operable screen image.

The address storage unit 33 stores user ID of registered user and destination information of this registered user to be associated with each other. The destination information in this embodiment represents an e-mail address provided to a mobile phone D that the registered user possesses (e.g., a user name of the e-mail address if domain names for the e-mail addresses of all registered users are identical).

The CPU 10 controls the e-mail processing unit 55 to create an e-mail which includes text information indicating a predetermined message to inform the authenticated user that the authenticated user has been forced to log-out, and that the setting change process executed by the authenticated user has been invalidated (hereinafter, referred to as an "information e-mail"). The destination information to be provided for a header of this information e-mail is destination information of the authenticated user. The e-mail processing unit 55 then transmits the created information e-mail. The mobile phone D, that is provided with the destination information contained in the information e-mail, receives the transmitted information e-mail, through the LAN 6 and the Internet N, from the I/F 56.

As described above, the fingerprint information registered in the fingerprint registering unit 31 is associated through the user ID with the destination information that the predetermined message is transmitted. It means that a combination of the fingerprint registering unit 31 and the address storage unit 33 functions as an address storage unit, and the e-mail processing unit 55 functions as a transmitting unit.

Figure 11:
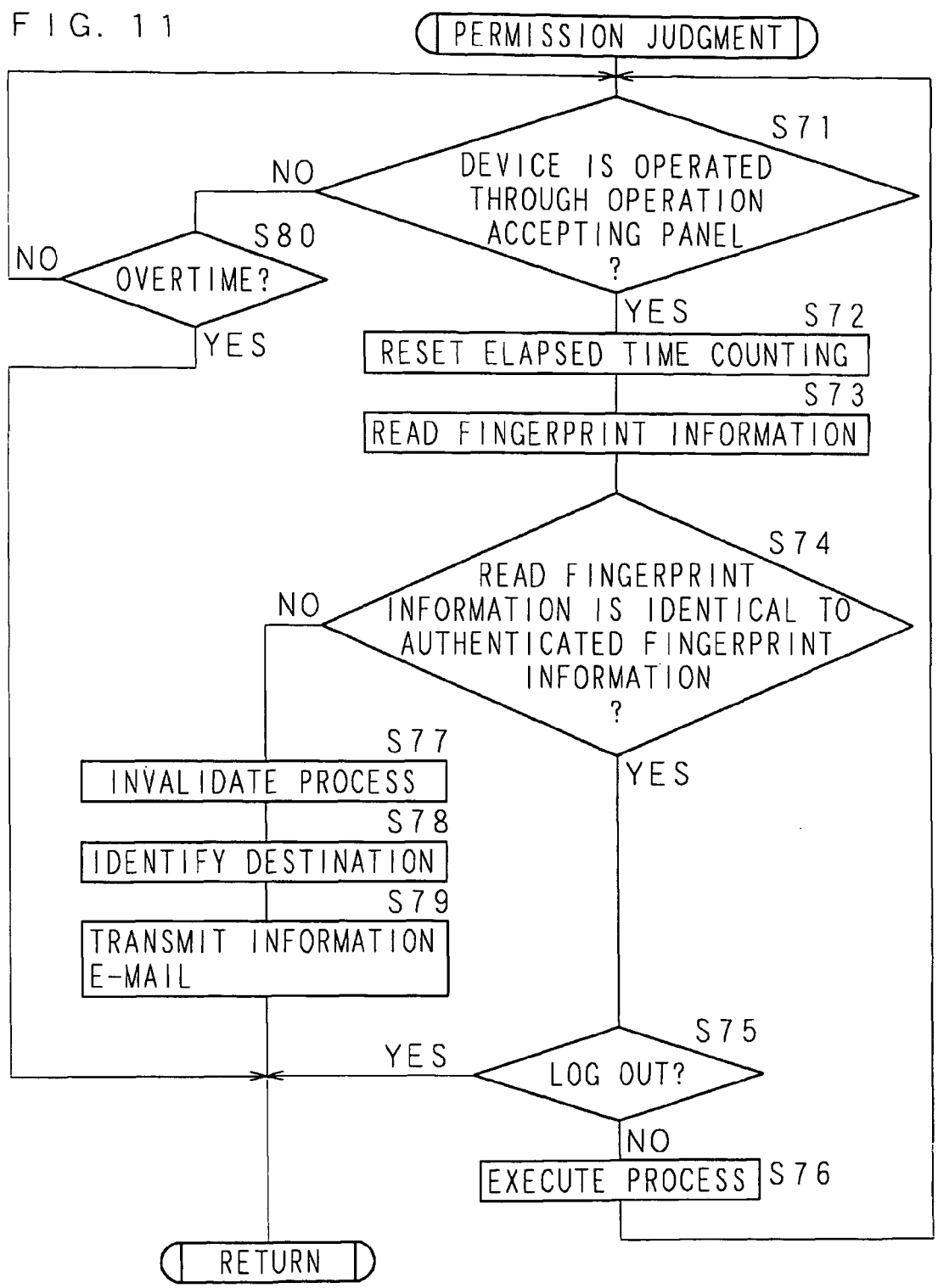
FIG. 11 is a flowchart showing a subroutine of permission judgment process to be executed by a CPU of the copying device with multifunction according to Embodiment 3 of the present invention.

FIG. 11 is a flowchart showing a subroutine of permission judgment process to be executed by a CPU of the multifunction copying device according to Embodiment 3 of the present invention. Because the processes S71-S76 and S80 of the permission judgment process of this embodiment correspond to the processes S31-S36 and S38 of the permission judgment process of Embodiment 1 shown in FIG. 6 and, thus, the descriptions thereof are omitted.

If the read fingerprint information and the authenticated fingerprint information are not identical ("NO" at S74), the user who operates through the operation accepting panel 22 at S71 is the non-authenticated user. Therefore, the CPU 10 invalidates the setting change process executed at S76 before "NO" judgment at S74 (S77), and then changes the setting reflected to the processed result of the setting change process back to the default setting. It means that the CPU 10 at S77 functions as an invalidating unit.

After the completion of the process S77, the CPU 10 identifies a destination information stored in the address storage unit 33 in association with the registered fingerprint information that is identical to the authenticated fingerprint information (i.e., the destination information of the authenticated user: S78). Then, the CPU 10 controls the e-mail processing unit 55 to create the information e-mail containing the identified destination information in the header and to transmit the information e-mail (S79). After the completion of the process S79, the CPU 10 terminates the subroutine of the permission judgment process and then returns the process back to the main routine. At this point, the processes S19 and below shown in FIG. 5 is executed. The authenticated user is forced to log-out, and the log-in screen image is then displayed on the LCD panel 21.

If the non-authenticated user operates through the operation accepting panel 22, the multifunction copying device 1 as described above resets the setting changed by the authenticated user to the default setting, makes the authenticated user log out, and executes the log-in process shown in FIG. 5. Therefore, if the non-authenticated user is the registered user, this non-authenticated user is allowed to be a new authenticated user. In addition, the multifunction copying device 1 does not maintain the setting changed by the previous authenticated user. Thus, the present authenticated user can comfortably use the multifunction copying device 1, following the previous authenticated user, without being forced to again change the setting.

Because the multifunction copying device 1 transmits an information e-mail to the previous authenticated user, the previous authenticated user can know the log-out and the invalidation of the own setting change process, by reading the information e-mail received by the mobile phone D. Therefore, the authenticated user can log-in again by later operation through the operation accepting panel 22, and then execute the invalidated setting change process, again.

As a result, the multifunction copying device 1 enhances the convenience for each authenticated user.

The invalidated process is not limited to the setting change process. For example, it may invalidate a reception process of sensitive data (specifically, it may interrupt the reception and discard the already received sensitive data). In this case, it prevents the present authenticated user from utilizing the sensitive data generated by a reception process that the previous authenticated has operated to execute. Therefore, the multifunction copying device 1 can improve the security.

The multifunction copying device 1 may use a phone number, a facsimile number, etc. as the destination information. In this case, for example, the multifunction copying device 1 plays audio information representing a predetermined message after calling the mobile phone D, or transmits image information indicating a predetermined message to a facsimile device of the registered user.

Further, if the CPU 10 judges to be "NO" at 74, the CPU 10 may judge, in advance, whether the read fingerprint information obtained at the process S73 is identical to the registered fingerprint information. If not being identical, the non-authenticated user is a non-registered user. Therefore, the CPU 10 may not execute the processes S77 and below. Alternatively, the CPU 10 may execute the process S37 shown in FIG. 6 and then return to the process S71. If being identical, after the completion of the process S79, the CPU 10 transits the process to S15, not to S11. Then, the CPU 10 may set a new authenticated fingerprint information that is registered and is identical to the read fingerprint information at the process S73.

The e-mail processing unit 55 may serve additionally as a non-illustrated e-mail processing unit to create an e-mail for executing an Internet facsimile communication.

Embodiment 4

Figure 12:
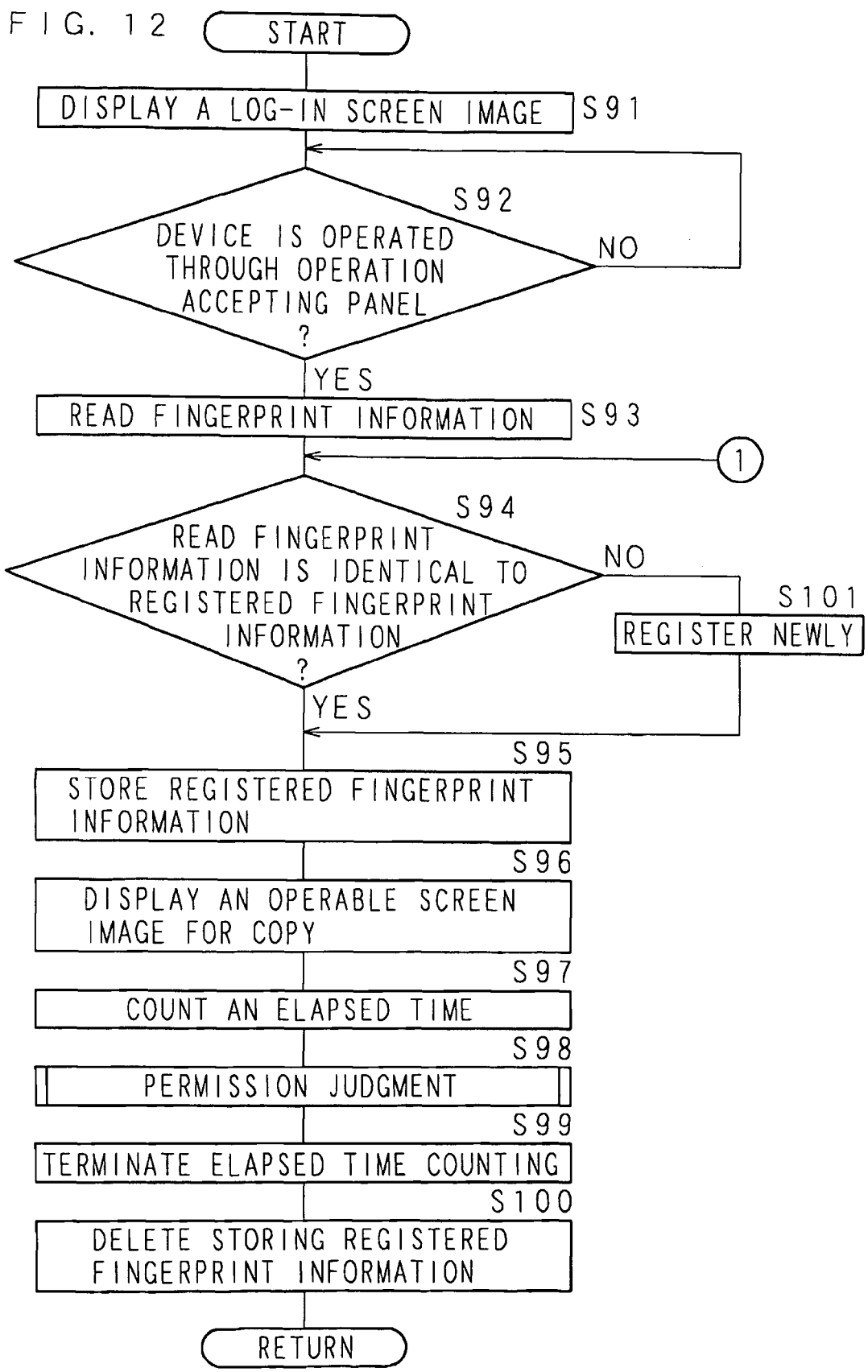
FIG. 12 is a flowchart showing procedures of a log-in process to be executed by a CPU of a copying device with multifunction as an processing apparatus according to Embodiment 4 of the present invention.

FIG. 12 is a flowchart showing procedures of a log-in process executed by a CPU of a multifunction copying device as an processing apparatus according to Embodiment 4 of the present invention. Because the processes S91-S100 of the log-in process of the Embodiment 4 correspond to the processes S11-S20 of the log-in process of Embodiment 1 shown in FIG. 5, thus, the descriptions thereof are omitted.

FIG. 13 is a flowchart showing a subroutine of permission judgment process procedures executed by the CPU of the multifunction copying device according to Embodiment 4 of the present invention. Because the processes S111-S119 of the permission judgment process of this embodiment correspond to the processes S71-S79 and S80 of the permission judgment process of Embodiment 3 shown in FIG. 11, thus, the descriptions thereof are omitted. Further, because the processes S120 and S121 of the permission judgment process of this embodiment correspond to the processes S99 and S100 of the log-in process shown in FIG. 12, the descriptions thereof are omitted.

A multifunction copying device 1 of this embodiment has a similar configuration to the multifunction copying device of Embodiment 3 (refer to FIG. 10). The same reference numerals are applied to the portions corresponding to those in Embodiments 1 and 3 and, thus, these descriptions are omitted.

As shown in FIG. 12 and FIG. 13, after the completion of the process S121, the CPU 10 transits the process to S94. It means that, if the read fingerprint information is not identical to the authenticated fingerprint information ("NO" at S114), the user who operates through the operation accepting panel 22 at S111 is the non-authenticated user. Therefore, the CPU 10 invalidates the setting change process (S117), identifies a destination information of the authenticated user (S118), transmits an information e-mail to the authenticated user (S119), terminates the counting of the elapsed time since the authenticated user has operated through the operation accepting panel 22 (S120), and then, deletes the registered fingerprint information stored in the RAM 12 at S95 (S121). In the result, the authenticated user is forced to log-out.

As shown in FIG. 12, after the completion of the process S93 or S121, the CPU 10 judges whether the fingerprint information read at S93 or S113 is identical to any one of the registered fingerprint information registered to the fingerprint registering unit 31 (S94).

If the read fingerprint information is identical to the registered fingerprint information ("YES" at S94), the user who operates through the operation accepting panel 22 at S92 or S111 is the registered user. Therefore, the CPU 10 exclusively stores, in the RAM 12, the registered fingerprint information that is judged to be identical to the read fingerprint information at S94 (S95), and then executes the processes S96 and below. At S97, the CPU 10 start to count the elapsed time since the multifunction copying device 1 has been operated through the operation accepting panel 22 at S92 or S111.

If the read fingerprint information is not identical to the registered fingerprint information ("NO" at S94), the user who operates through the operation accepting panel 22 at S92 or S111 is the non-registered user. Therefore, the CPU 10 newly registers this non-registered user (S101).

At S101, the CPU 10 accepts at least user ID and destination information for this new registration. For this reason, the CPU 10 controls to set, in the operation accepting panel 22, soft keys to input user ID and destination information, and controls to display, on the LCD panel 21, an operable screen image that prompts the non-registered user to input the user ID and the destination information. If the CPU 10 accepts the user ID and the destination information, the CPU 10 associates the inputted user ID with the fingerprint information that was read at S93 or S113 to register them to the fingerprint registering unit 31. The CPU 10 further associates the inputted user ID with the destination information to store them in the address storage unit 33. It means that the CPU 10 at S101 functions as a registering control unit. In addition, the CPU 10 may again read the fingerprint information, when the process S101 is executed.

After the completion of the process S101, the non-registered user becomes a registered user. Therefore, the CPU 10 then exclusively stores, in the RAM 12, the registered fingerprint information that is newly registered at S101 (S95), and executes the processes S96 and below.

If the CPU 10 judges to be "NO" at S114, the multifunction copying device 1 as described above executes the process S94, but not the process S91 (i.e., the log-in screen image is not displayed). Therefore, the user who is registered but not authenticated yet can use the multifunction copying device 1 as if the authentication procedure is omitted, by the authenticated user operating through the operation accepting panel 22 during log-in procedure.

On the other hand, the user who is not registered and authenticated can use the multifunction copying device 1 after the registration procedure.

After the registration procedure, the user who is not registered and authenticated becomes a registered user. Therefore, the multifunction copying device 1 can manage usage of such a user, similar to usage of the other registered user(s).

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A processing apparatus, comprising:
a touch panel which has a display panel displaying an operable screen image and an operation panel accepting an operation;
a processing unit which performs a process in accordance with the operation accepted by the touch panel;
a fingerprint storage unit which stores fingerprint information;
a timer which measures a predetermined period since the fingerprint storage unit has stored the fingerprint information;
a reading unit which reads, from the touch panel, fingerprint information of a finger touching the touch panel, each time the touch panel is touched;
an identity judgment unit which judges each time the reading unit reads fingerprint information whether the fingerprint information read by the reading unit and the fingerprint information stored in the fingerprint storage unit are identical;
a registering unit which registers fingerprint information;
a registering judgment unit which judges whether the fingerprint information read by the reading unit and the fingerprint information registered in the registering unit are identical, wherein the registering judgment unit is allowed to judge when the identity judgment unit judges the fingerprints not to be identical;
a storing control unit which exclusively stores one fingerprint information, that is identical to the fingerprint information read by the reading unit and is registered in the registering unit, in the fingerprint storage unit, when the registering judgment unit has judged the fingerprints to be identical; and
a condition determination unit which determines whether the predetermined period on the timer is expired,
wherein the processing unit executes the process in accordance with the operation accepted by the touch panel when the identity judgment unit judges the fingerprints to be identical during the predetermined period,
the processing unit does not execute the process in accordance with the operation accepted by the touch panel when the identity judgment unit judges the fingerprints not to be identical during the predetermined period,
the registering judgment unit is allowed to judge when the condition determination unit determines the predetermined period on the timer is expired, and
the registering judgment unit is not allowed to judge when the condition determination unit determines the predetermined period on the timer is not expired.

2. The processing apparatus according to claim 1, further comprising:
an invalidating unit which invalidates the process, when the identity judgment unit judges the fingerprints not to be identical.

3. The processing apparatus according to claim 1, further comprising:
a registering control unit which makes the registering unit, when the registering judgment unit judges the fingerprints not to be identical, register the fingerprint information read by the reading unit; wherein
after the registering control unit makes the registering unit register the fingerprint information, the storing control unit exclusively stores the fingerprint information in the fingerprint storage unit.

4. The processing apparatus according to claim 1, further comprising:
a screen image storage unit which stores the fingerprint information registered in the registering unit and an operable screen image to be displayed on the touch panel so as to associate with each other; and
a display control unit which displays the operable screen image stored in the screen image storage unit on the touch panel, wherein
when the registering judgment unit judges the fingerprints to be identical, the display control unit displays one of the operable screen associated with the fingerprint information that is identical to the fingerprint information read by the reading unit and is registered in the registering unit.

5. The processing apparatus according to claim 1, further comprising:
a destination storage unit which stores fingerprint information and destination information to transmit a predetermined message, so as to associate with each other; and
a transmitting unit which transmits the predetermined message, wherein
when the identity judgment unit judges the fingerprints not to be identical, the transmitting unit transmits the predetermined message to a destination, and the destination corresponds to the destination information that is stored in the destination storage unit and that is associated with the fingerprint information stored in the fingerprint storage unit.

6. The processing apparatus according to claim 1, wherein the fingerprint storage unit comprises a RAM that stores one set of the fingerprint information.

7. The processing apparatus according to claim 1, wherein the fingerprint storage unit comprises a RAM that stores the one fingerprint information when the registering judgment unit judges that the read fingerprint information and the fingerprint information registered in the registering unit are identical.

8. A processing apparatus, comprising:
a touch panel which has a display panel displaying an operable screen image and an operation panel accepting an operation;
a fingerprint storage unit which stores fingerprint information;
a timer which measures a predetermined period since the fingerprint storage unit has stored the fingerprint information;
a reading unit which reads, from the touch panel, fingerprint information of a finger touching the touch panel, each time the touch panel is touched;
a controller, coupled with the touch panel, the fingerprint storage unit, and the reading unit, performing the following operations of: performing a process in accordance with the operation accepted by the touch panel, and judging each time the reading unit reads fingerprint information whether the fingerprint information read by the reading unit and the fingerprint information stored in the fingerprint storage unit are identical;
a registering unit which registers fingerprint information;
a registering judgment unit which judges whether the fingerprint information read by the reading unit and the fingerprint information registered in the registering unit are identical, wherein the registering judgment unit is allowed to judge when the identity judgment unit judges the fingerprints not to be identical;
a storing control unit which exclusively stores one fingerprint information, that is identical to the fingerprint information read by the reading unit and is registered in the registering unit, in the fingerprint storage unit, when the registering judgment unit has judged the fingerprints to be identical; and
a condition determination unit which determines whether the predetermined period on the timer is expired,
wherein the controller executes the process in accordance with the operation accepted by the touch panel when the controller judges the fingerprints to be identical during the predetermined period,
the processing unit does not execute the process in accordance with the operation accepted by the touch panel when the identity judgment unit judges the fingerprints not to be identical during the predetermined period,
the registering judgment unit is allowed to judge when the condition determination unit determines the predetermined period on the timer is expired, and
the registering judgment unit is not allowed to judge when the condition determination unit determines the predetermined period on the timer is not expired.

9. The processing apparatus according to claim 8, wherein the fingerprint storage unit comprises a RAM that stores one set of the fingerprint information.

10. A processing apparatus, comprising:
a touch panel which has a display panel displaying an operable screen image and an operation panel accepting an operation;
a processing means for performing a process in accordance with the operation accepted by the touch panel;
a fingerprint storage means for storing fingerprint information;
a timer which measures a predetermined period since the fingerprint storage means has stored the fingerprint information;
a reading means for reading fingerprint information of a finger touching the touch panel, each time the touch panel is touched;
an identity judgment means for judging each time the reading means reads the fingerprint information whether the fingerprint information read by the reading means and the fingerprint information stored in the fingerprint storage means are identical;
a registering unit which registers fingerprint information;
a registering judgment unit which judges whether the fingerprint information read by the reading unit and the fingerprint information registered in the registering unit are identical, wherein the registering judgment unit is allowed to judge when the identity judgment unit judges the fingerprints not to be identical;
a storing control unit which exclusively stores one fingerprint information, that is identical to the fingerprint information read by the reading unit and is registered in the registering unit, in the fingerprint storage unit, when the registering judgment unit has judged the fingerprints to be identical; and
a condition determination unit which determines whether the predetermined period on the timer is expired,
wherein the processing means executes the process in accordance with the operation accepted by the touch panel when the identity judgment means judges the fingerprints to be identical during the predetermined period,
the processing means does not execute the process in accordance with the operation accepted by the touch panel when the identity judgment means judges the fingerprints not to be identical during the predetermined period, the registering judgment unit is allowed to judge when the condition determination unit determines the predetermined period on the timer is expired, and the registering judgment unit is not allowed to judge when the condition determination unit determines the predetermined period on the timer is not expired.

11. The processing apparatus according to claim 10, wherein the fingerprint storage unit comprises a RAM that stores one set of the fingerprint information.

* * * * *